(12) United States Patent
Ye et al.

(10) Patent No.: US 12,363,715 B2
(45) Date of Patent: Jul. 15, 2025

(54) V2X SIDELINK CHANNEL DESIGN

(71) Applicant: Apple Inc., Cupertino, CA (US)

(72) Inventors: Chunxuan Ye, San Diego, CA (US); Haitong Sun, Irvine, CA (US); Hong He, Cupertino, CA (US); Wei Zeng, San Diego, CA (US); Weidong Yang, San Diego, CA (US); Yushu Zhang, Beijing (CN); Chunhai Yao, Beijing (CN); Dawei Zhang, Saratoga, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 18/179,318

(22) Filed: Mar. 6, 2023

(65) Prior Publication Data

US 2023/0209553 A1 Jun. 29, 2023

Related U.S. Application Data

(63) Continuation of application No. 17/059,196, filed as application No. PCT/CN2019/121690 on Nov. 28, 2019, now Pat. No. 11,601,919.

(51) Int. Cl.
*H04W 72/20* (2023.01)
*H04L 5/00* (2006.01)
(Continued)

(52) U.S. Cl.
CPC ........... *H04W 72/20* (2023.01); *H04L 5/0048* (2013.01); *H04W 4/40* (2018.02); *H04W 72/40* (2023.01)

(58) Field of Classification Search
CPC .......... H04L 5/0048; H04W 4/40–48; H04W 72/02; H04W 72/1263; H04W 72/1268;
(Continued)

(56) References Cited

U.S. PATENT DOCUMENTS

2017/0289733 A1 10/2017 Rajagopal
2019/0037448 A1 1/2019 Shan
(Continued)

FOREIGN PATENT DOCUMENTS

| CN | 105282688 | 1/2016 |
|---|---|---|
| WO | 2018135905 | 7/2018 |
| WO | 2019195505 | 10/2019 |

OTHER PUBLICATIONS

Huang et al., "A Communication Method, Device and Readable Storage Medium," English Machine Translation of CN 112291046 B, Clarivate Analytics, pp. 1-26 (Year: 2024).*

(Continued)

*Primary Examiner* — Thomas R Cairns
(74) *Attorney, Agent, or Firm* — Kowert, Hood, Munyon, Rankin & Goetzel, P.C.

(57) ABSTRACT

Embodiments are presented herein of apparatuses, systems, and methods for performing vehicle-to-everything sidelink communication. A wireless device may receive vehicle-to-everything resource pool configuration information and sidelink control information. A number of resource elements allocated for a vehicle-to-everything physical sidelink shared channel may be determined based at least in part on the resource pool configuration information and the sidelink control information. A transport block size for the vehicle-to-everything physical sidelink shared channel may be determined based at least in part on the number of resource elements allocated for the vehicle-to-everything physical sidelink shared channel. A low density parity check base graph may be selected for the vehicle-to-everything physical sidelink shared channel based at least in part on the determined transport block size.

20 Claims, 11 Drawing Sheets

(51) Int. Cl.
*H04W 4/40* (2018.01)
*H04W 72/40* (2023.01)

(58) Field of Classification Search
CPC ..... H04W 72/20; H04W 72/25; H04W 72/40; H04W 72/04; H04W 72/12
See application file for complete search history.

(56) References Cited

U.S. PATENT DOCUMENTS

| | | | |
|---|---|---|---|
| 2019/0149365 A1 | 5/2019 | Chatterjee | |
| 2020/0366419 A1* | 11/2020 | Panteleev | H04L 5/0051 |
| 2022/0201711 A1* | 6/2022 | Lee | H04W 72/20 |

OTHER PUBLICATIONS

International Search Report and Written Opinion for Application No. PCT/CN2019/121690, mailed Sep. 2, 2020.

Extended European Search Report for EP Patent Application No. 19925560.2-1205; Oct. 22, 2021.
Apple "On NR V2X Physical Layer Structure"; 3GPP TSG RAN WG1 #99 R1-1912810; Reno, USA; Nov. 18-22, 2019.
Intel "Sidelink physical structure for NR V2X communication"; 3GPP TSG RAN WG1 Meeting #99 R1-1913255; Reno, USA; Nov. 18-22, 2019.
MediaTek Inc. "On sidelink physical layer structure"; 3GPP TSG RAN WG1 #96 R1-1901809; Athens, Greece; Feb. 25-Mar. 1, 2019.
Apple "Resource Allocation for Mode 2"; 3GPP TSG RAN WG1 #99 R1-1912812; Reno, USA; Nov. 18-22, 2019.
Fraunhofer HHI et al. "Design of NR V2X Physical Layer Structures"; 3GPP TSG RAN WG1 #99 R1-1912287; Reno, USA; Nov. 18-22, 2019.
Apple "Physical Layer Procedures for NR V2X Sidelink"; 3GPP TSG RAN WG1 #99 R1-1912814; Reno, USA; Nov. 18-22, 2019.
Qualcomm Incorporated "Physical Layer Procedures for Sidelink"; 3GPP TSG RAN WG1 Meeting #99 RI-1912950; Reno, USA; Nov. 18-22, 2019.
Office Action for CN Patent Application No. 201980035965.5; Feb. 29, 2024.

* cited by examiner

V2X SIDELINK CHANNEL DESIGN

PRIORITY CLAIM

This application is a continuation of U.S. patent application Ser. No. 17/059,196, filed Nov. 25, 2020, which is a national phase entry of PCT application number PCT/CN2019/121690, entitled "V2X Sidelink Channel Design," filed Nov. 28, 2019, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatuses, systems, and methods for wireless devices to perform sidelink communication in vehicle-to-everything (V2X) wireless cellular communications.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance.

V2X communication has potential to be a source of increasing demand and range of envisioned uses of wireless communication, which may present a variety of design and development challenges. Accordingly, improvements in the field in support of such development and design are desired.

SUMMARY

Embodiments are presented herein of apparatuses, systems, and methods for performing vehicle-to-everything (V2X) sidelink wireless cellular communications.

According to the techniques described herein, a wireless device may determine a transport block size for a V2X physical sidelink shared channel, and may determine a low density parity check base graph for the physical sidelink shared channel based at least in part on the determined transport block size. In some embodiments, the transport block size and/or the low density parity check base graph selection may further depend on whether the physical sidelink shared channel is being used for an initial transmission or a retransmission. Use of such an approach, and/or one or more other techniques described herein, may help reduce the likelihood, or potentially avoid altogether, the possibility that a different base graph is selected for a retransmission of a data frame than was selected for an initial transmission of the data frame.

Additionally, techniques are described herein for determining and utilizing a channel occupancy ratio on a per-session basis when performing V2X sidelink communication, supporting flexible demodulation reference signal configuration when slot aggregation is configured for V2X sidelink communication, performing resource selection for V2X sidelink communication, associating physical sidelink shared channel resources with physical sidelink feedback channel resources when performing V2X sidelink communication, and performing stage two sidelink control information resource mapping during V2X sidelink communication, among various other techniques. These various techniques may be used individually or in combination to support a V2X sidelink communication framework, at least according to some embodiments.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
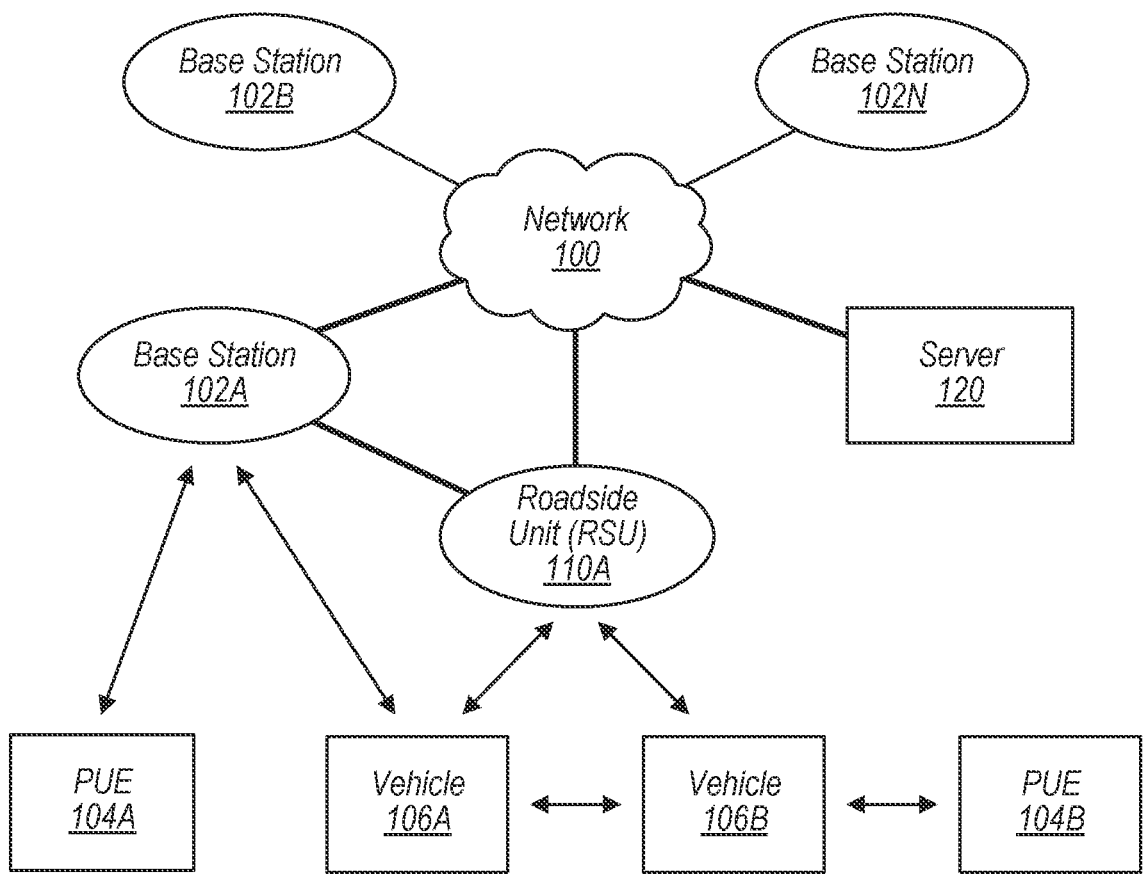
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems or devices that are mobile or portable and that perform wireless communications. Examples of UE devices include mobile telephones or smartphones (e.g., iPhone™ Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements include, for example, processors and associated memory, portions or circuits of individual processor cores, entire processor cores, individual processors, circuits such as an ASIC (Application Specific Integrated Circuit), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing said wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE embodiments. In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. For example, NR V2X sidelink communication techniques can also be used to perform device-to-device communications, at least according to some embodiments. Note also that some user devices in a V2X system (e.g., PUE 104A, as one possibility) may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an 'eNodeB', or eNB. Note that if the base station 102A is implemented in the context of NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may be capable of communicating with the base station 102A. The user devices shown, i.e., user devices 104A, 104B, 106A, and 106B may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a "sidelink" technology such as LTE PC5 or NR V2X sidelink communication techniques.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
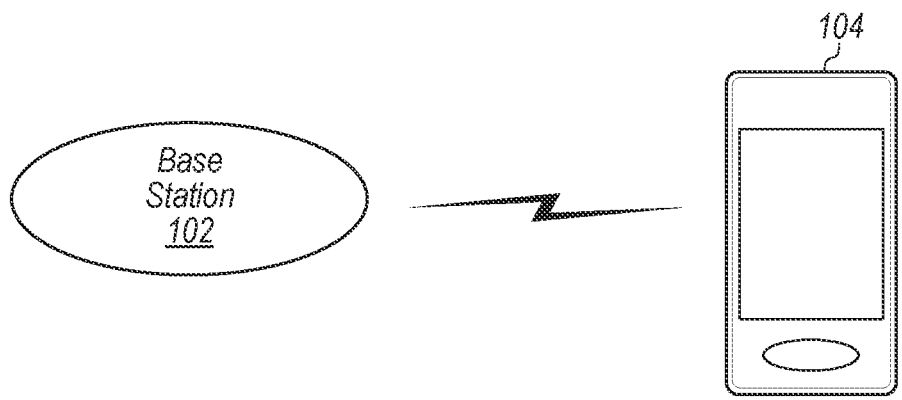
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor (processing element) that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array), an integrated circuit, and/or any of various other possible hardware components that are configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
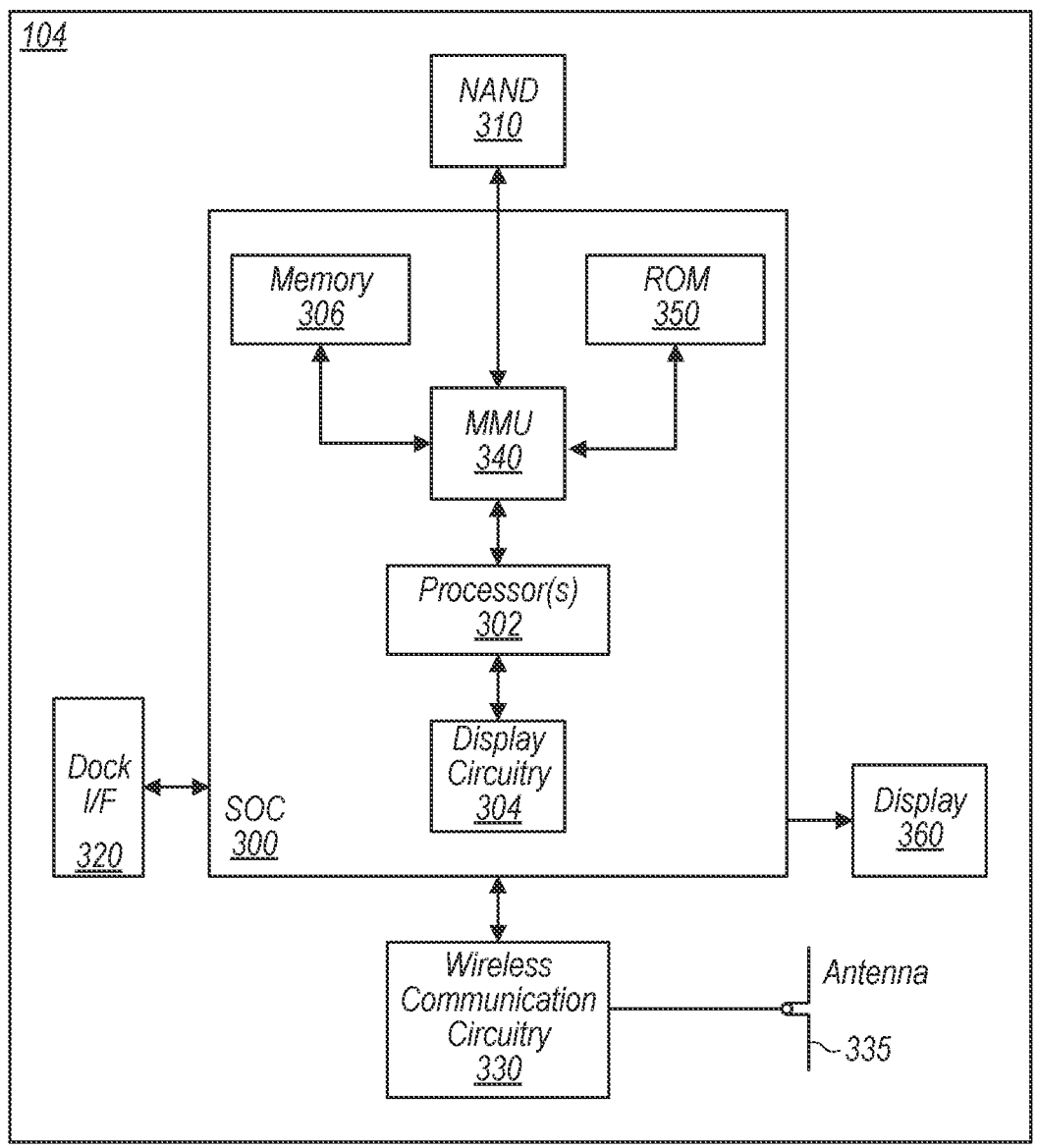
FIG. 3 is an example block diagram of a UE, according to some embodiments.

FIG. 3—Block Diagram of a UE

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing V2X sidelink communication, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
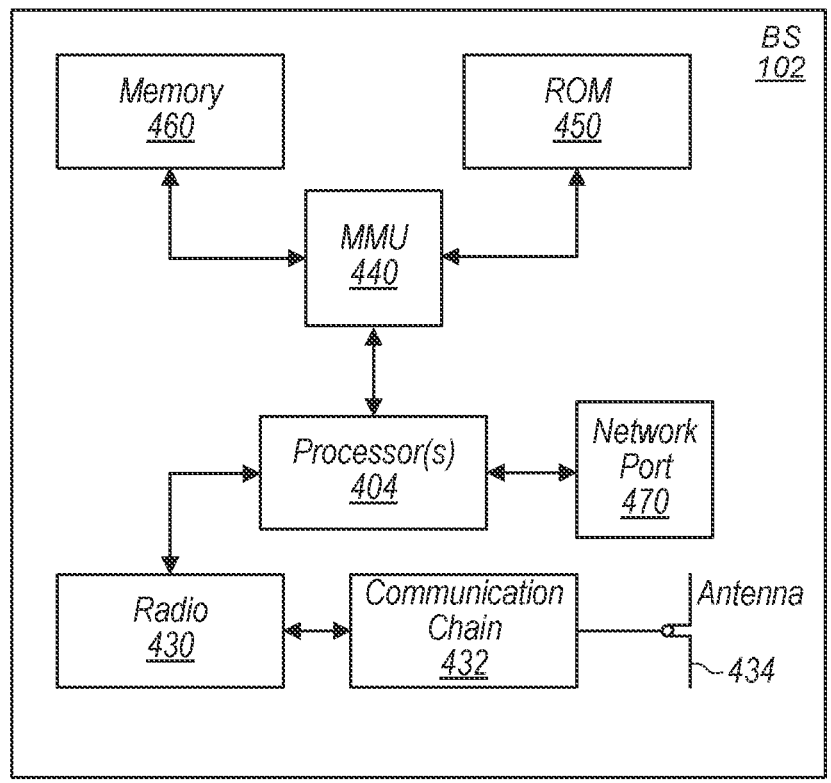
FIG. 4 is an example block diagram of a base station, according to some embodiments.

FIG. 4—Block Diagram of a Base Station

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
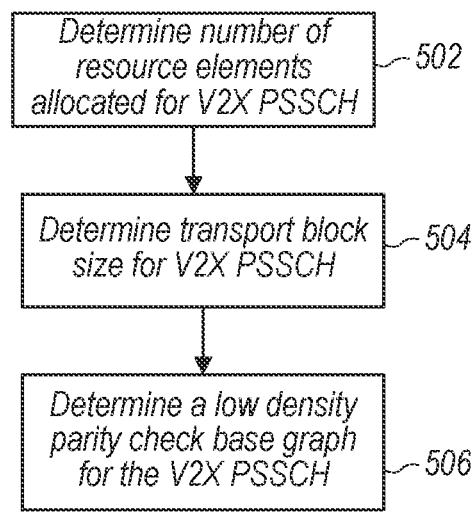
FIG. 5 is a flowchart diagram illustrating aspects of an exemplary technique for performing sidelink V2X transport block size determination and LDPC base graph selection, according to some embodiments.

FIG. 5—V2X Sidelink Communication

In wireless communications, specifically cellular wireless communications, sidelink communications represent a special kind of communication mechanism between devices that is not carried through a base station, e.g., through eNB/gNB. In other words, the devices communicate with each other without that communication going through a base station. In one sense, the devices may be said to be communicating with each other directly. Accommodation of such communication, however, requires a new physical layer design.

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, such as vehicle platooning, extended sensors, advanced driving, and remote driving.

In LTE V2X, broadcast sidelink communications are supported, in which maintenance of the sidelink connection is performed using keep-alive messages communicated between upper layers (e.g., application layers, non-access stratum layers, etc.) of the wireless devices in communication. NR V2X supports unicast and groupcast sidelink communications, e.g., in addition to broadcast sidelink communications.

In order to support such V2X sidelink communications, a variety of communication channels (e.g., control channels, data channels) may need to be provided. Accordingly, various possible techniques supporting V2X sidelink communication, including a variety of possible V2X channel design features and considerations, are proposed herein. The techniques may include for techniques for determining physical sidelink shared channel transport block size, techniques for determining a low density parity code base graph for use in decoding the physical sidelink shared channel, and various other techniques.

FIG. 5 is a flowchart diagram illustrating example aspects of such techniques, at least according to some embodiments. Aspects of the method of FIG. 5 may be implemented by a wireless device, such as a PUE 104, vehicle 106, any of various other possible wireless devices illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 5 may operate as follows.

In 502, the wireless device may determine a number of resource elements allocated for a V2X physical sidelink shared channel (PSSCH). The number of resource elements allocated for the V2X may be determined based at least in part on V2X resource pool configuration information and/or V2X sidelink control information that is received by the wireless device. For example, such information may indicate to the wireless device a set of sub-channels that carry the PSSCH, and a number of resource elements in each such sub-channel, based on which the wireless device may be able to determine the number of resource elements in the set of sub-channels that carry the PSSCH.

At least according to some embodiments, the set of sub-channels that carries the PSSCH may also include one or more other physical channels and/or certain overhead multiplexed with the PSSCH, which may reduce the number of resource elements allocated to the PSSCH relative to the total number of resource elements in the set of sub-channels that carry the PSSCH. Accordingly, determination of the number of resource elements allocated for the V2X PSSCH may further include subtracting the number of non-PSSCH resource elements in the set of sub-channels that carry the PSSCH from the total number of resource elements in the set of sub-channels that carry the PSSCH. The result may be determined to be the number of resource elements allocated for the V2X PSSCH, at least in some instances. It may be the case that the wireless device determines how many resource elements are allocated to such other physical channels and/or types of overhead based on the V2X resource pool configuration information and/or V2X sidelink control information.

Further, note that, at least according to some embodiments, the allocation of resource elements to the PSSCH and to the various other channels and potential overhead may be variable, e.g., from slot to slot, or according to any of various other possible configurations. For example, there could be dynamic and/or periodic changes to the number of resource elements allocated to any or all of first stage sidelink control information, demodulation reference signals, channel state information reference signals, a physical sidelink feedback channel, phase tracking reference signals (PTRS), AGC, GAP, and/or second stage sidelink control information, among various possibilities. Thus, at least according to some embodiments, the wireless device may perform determination of the number of resource elements allocated for the V2X PSSCH on a per-slot basis, and/or otherwise in a dynamic manner based on potential changes to the number of resource elements allocated for the V2X PSSCH.

In 504, the wireless device may determine a transport block size (TBS) for the V2X PSSCH. The TBS for the V2X PSSCH may be determined based at least in part on the number of resource elements allocated for the V2X PSSCH. For example, the actual TBS for the V2X PSSCH may be determined by the wireless device based on the actual number of resource elements allocated for the V2X PSSCH, the coding rate, the modulation order, and the number of layers configured for the V2X PSSCH. According to some embodiments, the coding rate, the modulation order, and the number of layers configured for the V2X PSSCH may be indicated to the wireless device in one or more of the V2X resource pool configuration information and/or the V2X sidelink control information.

According to some embodiments, in addition to the actual TBS for the V2X PSSCH, the wireless device may determine a model TBS for the V2X PSSCH. The model TBS may be calculated in a manner configured to nullify TBS calculation differences between PSSCH initial transmissions and PSSCH retransmissions. For example, the number of resource elements allocated to each type of non-PSSCH use of the set of sub-channels that carries the PSSCH may be set to a fixed value for the model TBS calculation, such that if the same approach to determining the model TBS is used for each of a PSSCH initial transmission and the PSSCH retransmission for the initial transmission, any differences in the number of resource elements allocated to non-PSSCH uses may be negated, which may result in a consistent model TBS result being obtained for the initial transmission and the retransmission.

In 506, the wireless device may determine a low density parity check (LDPC) base graph (BG) to use when decoding the PSSCH based at least in part on the determined TBS. For example, it may be the case that the LDPC BG is selected as either a first LDPC BG or as a second LDPC BG, depending on the determined TBS and the coding rate for the PSSCH.

According to some embodiments, the LDPC BG may be selected based at least in part on the model TBS (e.g., instead of the actual TBS), if a model TBS determination such as described above herein is performed by the wireless device. In such a scenario, it may be the case that LDPC BG selection may be consistent for initial transmissions and retransmissions, e.g., even if the actual TBS would be sufficiently different between an initial transmission and a retransmission to cause LDPC BG selection to differ between the initial transmission and the retransmission if the actual TBS were used to determine the LDPC BG. Note that even if the model TBS is used to determine the LDPC BG, the wireless device may still determine and use the actual TBS when performing PSSCH decoding.

As another possibility, the wireless device may consider the actual TBS when performing LDPC BG selection, and may also consider whether the V2X PSSCH is being used for an initial transmission or a retransmission (e.g., which the wireless device may determine based at least in part on the V2X sidelink control information). For example, the wireless device may select the LDPC BG for the V2X PSSCH based on the actual TBS and the coding rate for the V2X PSSCH if the V2X PSSCH is being used for an initial transmission. Similarly, the wireless device may select the LDPC base graph for the V2X PSSCH based on the actual TBS and the coding rate for the V2X PSSCH if the V2X PSSCH is being used for a retransmission, and if the sidelink control information for the initial transmission is unavailable. However, the wireless device may select the same LDPC base graph for the V2X PSSCH as used in the corresponding initial transmission if the V2X PSSCH is being used for a retransmission, and if the wireless device has the sidelink control information for the initial transmission.

As a still further possibility, the wireless device may consider the model TBS when performing LDPC BG selection, and may also consider whether the V2X PSSCH is being used for an initial transmission or a retransmission. For example, the wireless device may select the LDPC BG for the V2X PSSCH based on the model TBS and the coding rate for the V2X PSSCH if the V2X PSSCH is being used for an initial transmission. Similarly, the wireless device may select the LDPC base graph for the V2X PSSCH based on the model TBS and the coding rate for the V2X PSSCH if the V2X PSSCH is being used for a retransmission, and if the sidelink control information for the initial transmission is unavailable. However, the wireless device may select the same LDPC base graph for the V2X PSSCH as used in the corresponding initial transmission if the V2X PSSCH is being used for a retransmission, and if the wireless device has the sidelink control information for the initial transmission.

According to some embodiments, the wireless device may also or alternatively determine resource elements allocated to second stage sidelink control information in one or more sub-channels that carry the V2X PSSCH. In such resource element allocation determination, it may be the case that the resource elements allocated to the second stage sidelink control information are limited from the sub-channel boundary of the each such sub-channel by a frequency domain offset. This may help reduce or avoid in-band emission effects on the second stage sidelink control information, at least according to some embodiments.

According to some embodiments, the wireless device may determine one or more channel occupancy ratios for its V2X sidelink communication. For example, the wireless device may determine its overall or total channel occupancy ratio, and/or its channel occupancy ratio per priority level (e.g., based on the data priority level of any data communications performed by the wireless device). When determining whether to perform a V2X sidelink transmission, it may be the case that the wireless device considers whether such a V2X sidelink transmission would cause the wireless device to exceed a channel occupancy ratio limit for the wireless device (e.g., a maximum total channel occupancy ratio, or a maximum channel occupancy ratio for a specific data priority level).

In addition (or as an alternative) to total channel occupancy ratio and per priority level channel occupancy ratios, in some instances, the wireless device may determine one or more session-specific channel occupancy ratios for its V2X sidelink communication, which may be used in a similar manner to limit V2X sidelink transmissions by the wireless device to remain within one or more session-specific channel occupancy ratios. For example, the wireless device may determine a session-based channel occupancy ratio for each unicast or groupcast V2X sidelink communication session of the wireless device, and may determine whether to perform a V2X sidelink transmission for each such V2X sidelink communication session based at least in part on whether the V2X sidelink transmission would cause the channel occupancy ratio for that specific V2X sidelink communication session to exceed a channel occupancy ratio limit for the V2X sidelink communication session. If desired, such session based channel occupancy ratio determination and use could further be performed on a per priority level basis.

In some embodiments, it may be the case that slot aggregation could be configured for the V2X PSSCH. In such a scenario, it may be useful to support the possibility that different DMRS patterns could be used for different types of slots. For example, it could be the case that in such a scenario the wireless device receives configuration information indicating a demodulation reference signal (DMRS) configuration for each of a first slot of the V2X PSSCH, one or more middle slots of the V2X PSSCH, and a last slot of the V2X PSSCH. As another possibility, the DMRS pattern could be configured in terms of the starting DMRS symbol and the gap between two DMRS symbols, e.g., to kep similar DMRS density among the slots in the slot aggregation. For example, the configuration information could indicate a starting DMRS symbol and a gap between DMRS symbols for the V2X PSSCH.

According to some embodiments, the wireless device may be operating in a manner such that the wireless device performs resource selection for its V2X sidelink transmissions, which may also be referred to as a "mode 2" wireless device. In such a scenario, it may be beneficial for the wireless device to consider the potential impact on its transmissions of its own and/or other wireless devices' half-duplex limitations. For example, if the wireless device is unable to (or not configured to) transmit and receive simultaneously, scheduling a transmission during the same slot that the wireless device is scheduled to receive a transmission by another wireless device may result in the wireless device being unable to receive the transmission. Similarly, if a destination wireless device is unable to (or not configured to) transmit and receive simultaneously, scheduling a transmission to the destination wireless device during the same slot that the destination wireless device is scheduled to perform a transmission may result in the destination wireless device being unable to receive the transmission.

Accordingly, at least in some instance, the wireless device may be configured to exclude certain resources from selection for sidelink unicast and/or groupcast transmissions in consideration of such half-duplex issues. For example, as one possible approach to such resource exclusion, when performing resource selection for a V2X sidelink transmission from the wireless device, the wireless device may determine if one or more resources are reserved for V2X sidelink transmission by a wireless device that is a destination wireless device for the V2X sidelink transmission by the first wireless device, and/or may determine if one or more resources are reserved for V2X sidelink transmission to the first wireless device. If one or more resources are reserved for V2X sidelink transmission by a destination wireless device, any resources in the same time slot(s) as the resource(s) reserved for V2X sidelink transmission by the destination wireless device may be excluded from the resource selection. Similarly, if one or more resources are reserved for V2X sidelink transmission to the wireless device, any resources in the same time slot(s) as the resource(s) reserved for V2X sidelink transmission to the wireless device may be excluded from the resource selection.

Alternatively, the wireless device may initially perform resource selection for a V2X sidelink transmission by the wireless device without any half-duplex issue based resource exclusion. In such a scenario, the wireless device may determine if any resources are reserved for V2X sidelink transmission by a destination wireless device, and/or if any resources are reserved for V2X sidelink transmission to the wireless device. The wireless device may then remove any resources in the same time slot as any resources reserved for V2X sidelink transmission by a destination wireless device and/or any resources in the same time slot as any resources reserved for V2X sidelink transmission to the wireless device from the resources selected for the V2X sidelink transmission by the wireless device.

In a still further possible approach, the wireless device may also initially perform resource selection for a V2X sidelink transmission by the wireless device without any half-duplex issue based resource exclusion, and determine if any resources are reserved for V2X sidelink transmission by a destination wireless device, and/or if any resources are reserved for V2X sidelink transmission to the wireless device. In this approach, however, the wireless device may drop the V2X sidelink transmission by the wireless device if any resources selected are in the same time slot as any resources reserved for V2X sidelink transmission by a destination wireless device or if any resources selected are in the same time slot as any resources reserved for V2X sidelink transmission to the wireless device.

Note that in any of the various approaches to performing resource selection described herein that include potential resource exclusions in consideration of the half-duplex issue, the potential resource exclusions may additionally depend at least in part on the relative priority levels of the potential transmissions, e.g., if desired. For example, the wireless device may determine relative priority levels of any or all of scheduled V2X sidelink transmission(s) by the destination wireless device(s), V2X sidelink transmission(s) to the first wireless device, and the V2X sidelink transmission being scheduled the first wireless device, as applicable. Then, when determining whether to exclude any resources in the same time slot(s) as any resource(s) reserved for V2X sidelink transmission by a destination wireless device or any resources in the same time slot as any resource(s) reserved for V2X sidelink transmission to the wireless device from the resource selection, if the V2X sidelink transmission by the wireless device has a higher priority than any other scheduled resource usage in a given time slot, the resources in that time slot may not be excluded from the resource selection process.

According to some embodiments, it may be the case that certain associations are specified between when data is communicated on a V2X PSSCH and when feedback for that V2X PSSCH communication is scheduled to be provided on a V2X physical sidelink feedback channel (PSFCH). For example, PSFCH resources may be configured with a certain periodicity (e.g., every slot, every 2 slots, every 4 slots, etc.), such that there may be limitations when PSFCH resources are available on which to provide feedback. As one possibility, the slot in which feedback for the V2X PSSCH is expected may be specified as the first slot in which a V2X physical sidelink feedback channel (PSFCH) is present after a specified PSFCH gap. At least in some instances, the value of the PSFCH gap may be determined based at least in part on the periodicity of the V2X PSFCH. For example, the PSFCH gap value could be smaller for longer periodicity values than for shorter periodicity values. Such an approach may reduce the delay from when data is communicated on a V2X PSSCH and when feedback for that V2X PSSCH communication is provided (e.g., for higher PSFCH periodicity values), according to some embodiments.

In some instances, it may also or alternatively be the case that the manner in which the frequency domain resources of the V2X PSFCH that are associated with a PSSCH transmission is specified. For example, as PSFCH resources may be configured with a certain periodicity, it may be the case that feedback for multiple PSSCH transmissions is multiplexed on the PSFCH resources, e.g., in a certain specified manner. Thus, at least in some instances, the frequency domain resources of the PSFCH that are associated with a given PSSCH transmission may depend at least in part on the periodicity of the V2X PSFCH.

As a further example, consider a scenario in which a set of V2X PSFCH frequency resources are used for feedback for a groupcast transmission. For such a scenario, it may be the case that feedback from the multiple recipients of the groupcast transmission may be multiplexed on the PSFCH resources, e.g., in a certain specified manner. Thus, at least in some instances, it may be the case that the V2X PSFCH frequency resources on which feedback from a given recipient of a V2X PSSCH transmission is expected are determined based at least in part on a group size of a groupcast group associated with the V2X PSSCH transmission.

FIGS. 6-14 and Additional Information

FIGS. 6-14 illustrate further aspects that might be used in conjunction with the method of FIG. 5 if desired. It should be noted, however, that the exemplary details illustrated in and described with respect to FIGS. 6-14 are not intended to be limiting to the disclosure as a whole: numerous variations and alternatives to the details provided herein below are possible and should be considered within the scope of the disclosure.

According to some embodiments, it may be the case that NR V2X supports two stage SCI. In such a case, information related to channel sensing may be carried in the first stage of the SCI. The second stage SCI may be decoded using PSSCH DMRS. Polar coding may be used for the PDCCH and also applied to second stage SCI. The payload size for the first stage SCI in the case of two stage SCI case may be the same for unicast, groupcast, and broadcast in a resource pool. After decoding the first stage, it may be the case that the receiver does not need to perform blind decoding of second stage.

According to some embodiments, it may be the case that, in a resource pool, within the slots associated with the resource pool, PSFCH resources can be (pre)configured periodically with a period of N slot(s). N may be configurable, with various values being possible, (e.g., 1 and at least one value that is greater than 1). The configuration may also include the possibility that no resources are provided for the PSFCH. In this case, HARQ feedback for all transmissions in the resource pool may be disabled. It may be the case that HARQ feedback for transmissions in a resource pool can only be sent on a PSFCH in the same resource pool. A sequence-based PSFCH format with one symbol (e.g., not including AGC training period) may be supported. This may be applicable for unicast and groupcast including options 1 and 2. The sequence of PUCCH format 0, or a sequence derived based at least in part on that format, may be used. It may be possible that 1 PRB or multiple PRBs is/are used for this PSFCH format. It may be the case that a X-symbol PSFCH format could be used, with a repetition of the one-symbol PSFCH format (e.g., not including AGC training period), where X=2 and/or any of various other possible values of X could be supported. It may be the case that a PSFCH format based on PUCCH format 2 could be supported. It may be the case that a PSFCH format spanning all available symbols for sidelink in a slot could be supported. It may be the case that for the periodicity value for how often PSFCH resources are configured, (e.g., N slot(s)), N=2 and N=4 are additionally supported.

In NR DL, TBS calculation may be based on coding rate, modulation, number of layers, and the total number of resource elements (REs) for the PDSCH. The number of REs for the PDSCH is determined by multiplying (number of REs per RB)*(number of RBs).

Figure 6:
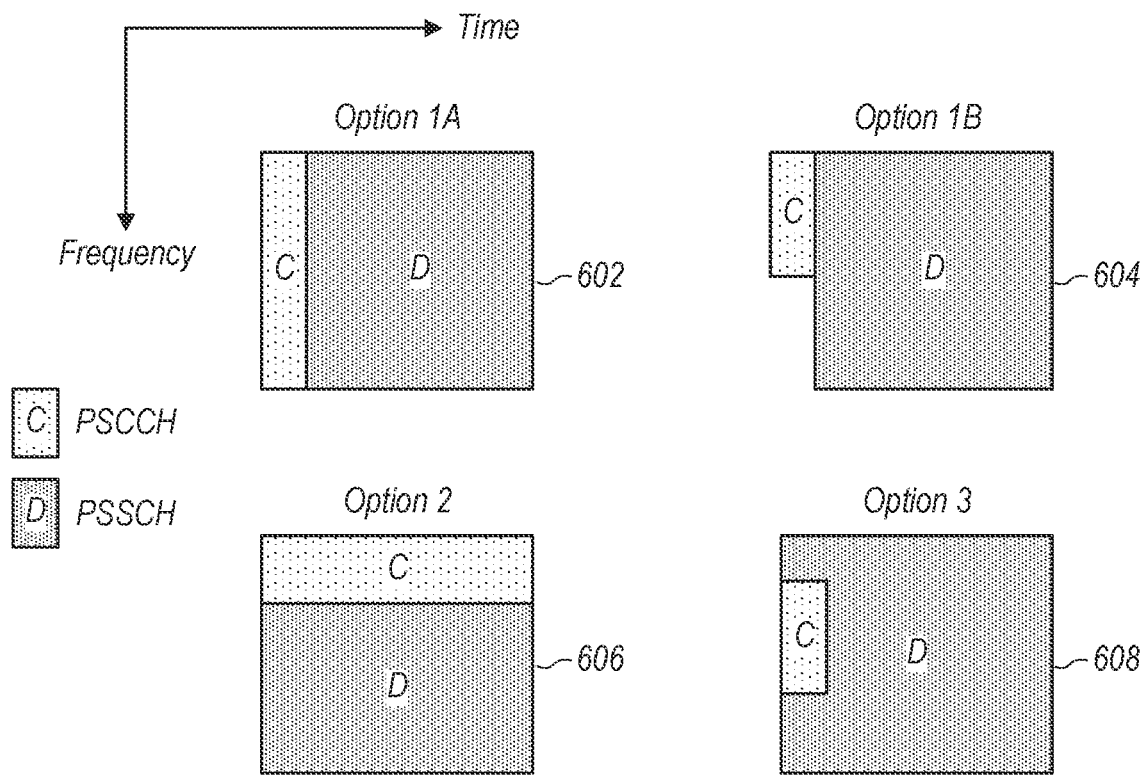
FIG. 6 illustrates aspects of various possible PSCCH and PSSCH multiplexing options, according to some embodiments.

In NR V2X, several PSSCH and PSCCH multiplexing options may be possible, including 'option 1A' 602, 'option 1B' 604, 'option 2' 606, and 'option 3' 608, illustrated in FIG. 6. For example, in the case of 'option 3' 608, the PSCCH and PSSCH resources are combined in a block. It may be useful for the calculation of the PSSCH resource size to consider this possible approach to multiplexing the PSSCH and the PSCCH, and it may accordingly be useful to provide a new TBS calculation formula that includes this consideration. It may further be the case that some sidelink overhead could be carefully excluded from the total channel resources when calculating the PSSCH resource size, at least in some embodiments.

Figure 7:
FIG. 7 is a graph illustrating aspects of an exemplary possible LDPC base graph selection mechanism, according to some embodiments.

In NR Uu data channel, two LDPC base graphs (BG) may be possible, and may be designed with different usage conditions. BG selection may depend on code rate and TBS, as shown in FIG. 7, at least according to some embodiments.

It may be the case that up to 1 blind retransmission is supported in LTE V2X. In NR V2X sidelink, blind retransmission may also be supported. It may be the case that a receiving UE obtains just 1 copy of the blind retransmission, e.g., due to half duplex configuration.

In NR V2X sidelink, the PSFCH may occupy the last few symbols in a slot. The PSFCH may be time division multiplexed (TDM) with the PSCCH/PSSCH. As previously noted herein, the PSFCH periodicity may be larger than 1 slot, in which case it may be possible that not every slot has PSFCH resources. Furthermore, it may be possible that the PSFCH may not occupy all sub-channels in a slot. For example, the PSFCH may instead only occupy one or several sub-channels in frequency.

Thus, it could occur that the TBS calculation for an initial transmission may be different from the TBS calculation for a blind retransmission. This TBS mismatch may lead to a mismatch in the selection of the LDPC BG between the initial transmission and the retransmission, which could lead to a decoding error. Accordingly, it may be useful to implement a TBS calculation approach and/or LDPC BG selection approach that can reduce the likelihood of such a LDPC BG selection mismatch.

As previously noted herein, there may be two LDPC Base Graphs (BG) defined in the NR Uu link. The selection between these two LDPC BGs may depend on the Transport Block Size (TBS) and nominal Code Rate (CR). The nominal CR may be the target code rate indicated in the MCS field. The TBS may be calculated based on the number of resources (i.e., resource elements or REs) allocated for the PDSCH or PUSCH, the CR, the modulation order, and the number of layers.

In NR V2X sidelink, a similar (or the same) set of two LDPC BGs can be used for the PSSCH. The selection between these two BGs can depend on CR and TBS, e.g., similar to in the NR Uu link. The CR may be indicated in the MCS field. The calculation of the TBS can be based on a different procedure from the NR Uu link, e.g., since the number of REs for the PSSCH may be dynamically changed between slots for any or all of a variety of possible reasons. As one possible reason, the PSSCH DMRS time and/or frequency density may be dynamically changed, depending on UE speed(s) and/or other considerations. As another possible reason, it may be the case that CSI-RS for sidelink unicast may or may not appear in each PSSCH transmission. As a further possible reason, it may be the case that the PSFCH occupies some potential PSSCH resources in certain slots and/or in certain sub-channels, and does not occupy those potential PSSCH resources in certain other slots and/or sub-channels. Additionally, it may be the case that the second stage SCI could occupy some potential PSSCH resources. As a still further possible reason, possible AGC symbol or GAP symbol RE comb-type multiplexing with the PSSCH could occupy some potential PSSCH resources.

The determination of the TBS may also consider the impact of the possible use of 'Option 3' for PSCCH and PSSCH multiplexing, in particular including accounting for the REs occupied by the PSCCH. Since the PSCCH may appear only in one sub-channel, it may be the case that the calculation of PSSCH REs is not directly based on a number of PSSCH REs per PRB or per sub-channel. For example, the calculation of PSSCH REs may be based on the total REs allocated for PSCCH/PSSCH minus the total REs allocated for PSCCH.

Thus, the calculation of the TBS may similarly not be based only upon a calculation of PSSCH resources in each RB, e.g., due to its non-symmetric distribution. The calculation of TBS may be based on the calculation of the whole PSCCH/PSSCH resources minus the PSCCH resources and other reference signal and/or PSFCH overhead.

According to some embodiments, a receiver UE may determine the actual TBS of PSSCH with the following procedure. The receiver UE may receive the resource pool configurations, including: PSCCH/PSSCH sub-channel size $N_{RB}^{SCH}$, in units of RBs; PSFCH time periodicity, in units of slots; multiplexing of PSSCH on AGC symbol and/or GAP symbol; PSCCH symbol duration $N_{sym}^{PSCCH}$ in units of symbols; and PSCCH frequency size (if fixed), in units of RBs.

The receiver may decode the SCI, which may include: number of sub-channels of PSCCH/PSSCH: $N_{SCH}^{PSSCH}$; DMRS time and/or frequency domain density; existence and density of CSI-RS; PTRS time and/or frequency domain density; existence and format of the second stage of the SCI; and the number of REs of PSCCH: $N_{RE}^{PSCCH}$.

The receiver may determine the number of REs allocated for PSSCH as:

$$N_{RE}^{PSSCH} = N_{SCH}^{PSSCH} \cdot N_{RE}^{SCH} \cdot N_{slot}^{PSSCH} - N_{RE}^{PSCCH} - N_{RE}^{DMRS} - N_{RE}^{CSIRS} - N_{RE}^{PTRS} - N_{RE}^{PSFCH} - N_{RE}^{AGC/GAP} - N_{RE}^{SCI2} \quad (1),$$

where:
$N_{SCH}^{PSSCH}$ is the number of sub-channels of this PSCCH/PSSCH. This information may be obtained from SCI;
$N_{slot}^{PSSCH}$ or is the number of slots of this PSCCH/PSSCH for the case of slot aggregation. This information may be obtained from SCI;
$N_{RE}^{SCH} = N_{RBN}^{SCH} \cdot N_{RE}^{RB}$ is the number of REs of a sub-channel, where $N_{RE}^{RB} = 12$ and $N_{RB}^{SCH}$ is obtained from resource pool configuration;
$N_{RE}^{PSCCH} = N_{sym}^{PSCCH} \cdot N_{RE}^{RB}$ is the number of REs of PSCCH, where $N_{sym}^{PSCCH}$ is the number of symbols of PSCCH, which may be (pre)configured by resource pool configuration. $N_{RBG}^{PSCCH}$ is the number of resource block groups for PSCCH. This number may be pre-defined, preconfigured based on resource pool, or may be obtained by blind decoding of PSCCH. In case of a two stage SCI scheme, $N_{RE}^{PSCCH}$ may be the number of REs of PSCCH for first stage SCI only, or may be the sum of the number of REs of PSCCH for first stage SCI and the number of REs of PSSCH or PSCCH for second stage SCI; $N_{RE}^{DMRS}$ is the number of REs of PSSCH DMRS. The time domain density of DMRS may be dynamically changed and may be indicated in SCI. The frequency domain density of DMRS may be predefined or may be dynamically changed and indicated in SCI;
$N_{RE}^{SCI\_RS}$ is the number of REs of CSI-RS in PSSCH. The existence of this overhead may be indicated in SCI. The density of CSI-RS in PSSCH may be predefined, or preconfigured, or indicated in SCI;
$N_{RE}^{PTRS}$ is the number of REs of PSSCH PTRS. The time domain density of PTRS may be dynamically changed based on MCS and PSSCH scheduled frequency resources.
$N_{RE}^{PSFCH}$ the number of REs of PSFCH. This field may or may not exist for every slot in a resource pool. If it exists for the slot, then the last few symbols spanning over part or all sub-channel may be used for PSFCH;
$N_{RE}^{AGC/GAP}$ is the number of REs for AGC and GAP; and $N_{RE}^{SCI2}$ is the number of REs for SCI part (stage) 2. This field may or may not exist. If it exists, the number of REs may be indicated in SCI part 1.

$N_{info} = N_{RE}^{PSSCH} \cdot R \cdot Q_m \cdot vQ_m v$ The receiver may calculate an intermediate number of information bits $N_{info} = N_{RE}^{PSSCH} \cdot R \cdot Q_m \cdot vQ_m v$ where R is the coding rate, is the modulation order and is the number of layers.

$N_{info} = N_{RE}^{PSSCH} \cdot R \cdot Q_m \cdot vQ_m v$

The receiver may use either a TBS table or a TBS formula to calculate the actual TBS using this information.

The number of REs allocated to PSSCH calculated by the receiver may be different between an initial transmission and a retransmission due to one or more of various possible reasons. For example, the PSSCH in the initial transmission may share the slot with a PSFCH, while the PSSCH in the retransmission may not share the slot with a PSFCH, or vice versa. As another possibility, the PSSCH in the initial transmission may include CSI-RS or PTRS, while the PSSCH in retransmission may not include CSI-RS or PTRS, or vice versa. As a still further possibility, the PSSCH in the initial transmission may have a different DMRS symbol density from the PSSCH in the retransmission, or vice versa.

Thus, it may be possible for the calculated actual TBS for the initial PSSCH transmission to be different from the calculated actual TBS for the PSSCH retransmission, e.g., based on the preceding TBS determination procedure described herein. Accordingly, if the LDPC BG selection is based on the calculated actual TBS for each PSSCH transmission, the selected BG may be different for a PSSCH initial transmission and a PSSCH retransmission, which may cause a PSSCH decoding error. There may be multiple possible techniques for avoiding such a LDPC BG selection discrepancy. For example, one of the following approaches (or a combination of multiple of the following approaches) may be applied, according to some embodiments.

Figure 8:
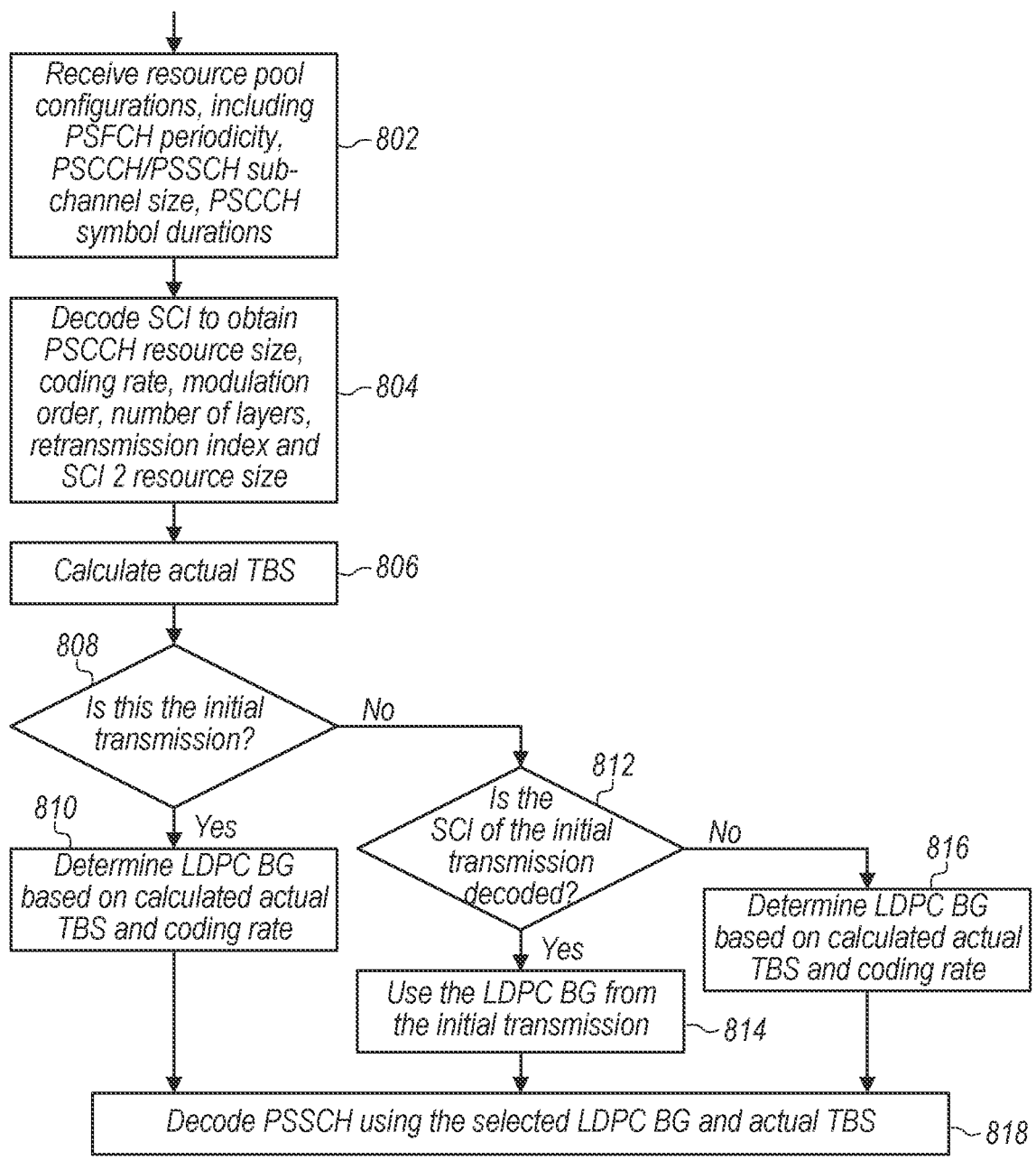
FIGS. 8-9 are flowchart diagrams illustrating further details of exemplary possible techniques for performing LDPC base graph selection for PSSCH decoding, according to some embodiments.

In a first approach, the LDPC BG selection may be based on the coding rate and actual TBS of the initial PSSCH transmission if possible. FIG. 8 shows an exemplary such LDPC BG selection procedure at Rx UE side. In 802, a receiving UE receives resource pool configurations, including PSFCH periodicity, PSSCH/PSSCH sub-channel size, PSCCH symbol durations, etc. In 804, the UE may decode the SCI for a certain PSSCH transmission, and may obtain PSCCH resource size, coding rate, modulation order, layer number, retransmission index. In 806, based on equation (1), the UE may calculate the number of REs of PSSCH, and may further calculate the actual TBS using this information. In 808, from the SCI parameter "retransmission index", the UE may be able to determine whether the current PSSCH transmission is an initial transmission or a retransmission. For an initial transmission, in 810, the UE may determine the LDPC BG based on the calculated actual TBS and coding rate. For a retransmission, in 812, the UE may check whether it has decoded the SCI of the initial PSSCH transmission. If so, in 814, the UE may use the selected LDPC BG from the initial transmission. Otherwise, in 816, the UE may determine the LDPC BG based on the calculated actual TBS and coding rate. In 818, the UE may decode the PSSCH using the selected LDPC BG and the actual TBS.

Figure 9:
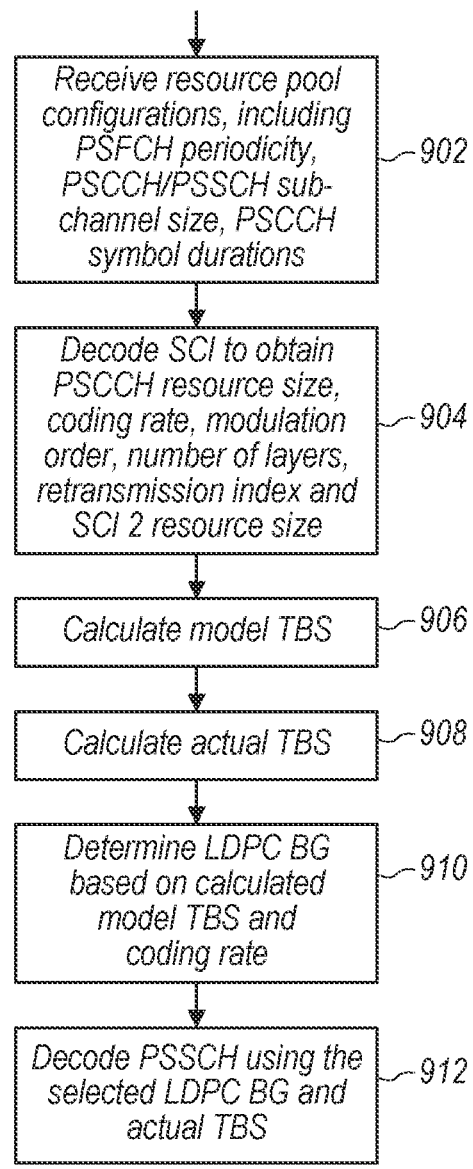

In a second possible approach, the LDPC BG selection may be based on the coding rate and a "model" TBS. The model TBS may be designed such that the potentially different overhead between a PSSCH initial transmission and a PSSCH retransmission is nullified or dismissed. FIG. 9 is a flowchart diagram illustrating aspects of such a possible approach, according to some embodiments.

The model TBS determination procedure may include, in 902, receiving the resource pool configurations, e.g., with the same information previously described herein for actual TBS determination procedure.

In 904, the receiver may decode the SCI, which may include the number sub-channels of PSCCH/PSSCH ($N_{SCH}^{PSSCH}$), number of REs of PSCCH ($N_{RE}^{PSCCH}$) and the number of REs of PSSCH for SCI stage 2 ($N_{RE}^{SCI2}$).

In 906, the receiver may calculate the model TBS. To do so, the receiver may determine the number of REs allocated for the PSSCH as in equation (1), where the dynamically changed fields are fixed or preconfigured, rather than by indicated in SCI. For example, in equation (1), $N_{RE}^{DMRS}$ may be fixed or preconfigured, no matter what the actual time and/or frequency domain density of DMRS are. Similarly, $N_{RE}^{CSI\_RS}$ or $N_{RE}^{PTRS}$ may be fixed or preconfigured, no matter whether CSI-RS or PTRS is actually transmitted in PSSCH. For example, this field may always be set to 0. $N_{RE}^{PSFCH}$ may be fixed or preconfigured, no matter whether the actual PSFCH exists or not. For example, this field may always be set to 0. For example, this field may always be set to 0 if no PSFCH resources are allocated; this field may always be set to a non-zero value if PSFCH periodicity is 1 slot; and this field may be configured to 0 or a non-zero value if PSFCH periodicity is 2 or 4 slots, as one possibility. $N_{RE}^{AGC/GAP}$ may be fixed or preconfigured, no matter whether or not PSSCH is actually multiplexed on AGC symbol or GAP symbol. For example, it may always be assumed that the PSSCH is not multiplexed on AGC symbol or GAP symbol.

The receiver may calculate a model intermediate number of information bits $N_{info} = N_{RE}^{PSSCH} \cdot R \cdot Q_m \cdot v$, where R is the coding rate, $Q_m$ is the modulation order and v is the number of layers.

The receiver may use either a TBS table or a TBS formula to calculate the model TBS using this information.

Note that in such an approach, the receiving UE may calculate both model TBS and actual TBS. For example, as shown, in 908, the UE may calculate the actual TBS. In 910, the receiving UE may use the model TBS for selecting LDPC BGs, and, in 912, may use the selected LDPC BG and the actual TBS in the PSSCH decoding.

In a third approach, for a PSSCH initial transmission, the LDPC BG selection may be based on the coding rate and model TBS in the initial PSSCH transmission. For a PSSCH retransmission, the LDPC BG selection may be based on the previous PSSCH transmission (of the same TB) if this information is available, or the LDPC BG selection may be based on the coding rate and model TBS of the retransmitted PSSCH if the LDPC BG selection in the PSSCH previous transmission (of the same TB) is not available. Then, the PSSCH decoding may be based on the selected LDPC BG and the actual TBS.

In LTE V2X, the metric of channel occupancy ratio (COR) may be evaluated by each UE. For example, at a subframe n, the total number of sub-channels used for a UE's transmission in subframes [n−a, n−1] and granted in subframes [n, n+b] divided by the total number of sub-channels in the transmission pool over [n−a, n+b] may be specified as being equal to the COR of the UE, at least according to some embodiments. In some instances, the COR may further be calculated per priority level, i.e., $COR(p_i)$ for the data priority level $p_i$.

The metric of COR may be aimed to limit the maximum channel occupancy of a single UE. In NR V2X, a UE may have sidelink broadcast, unicast and groupcast. For sidelink unicast or groupcast, it may be feasible to restrict the maximum channel occupancy of each single session (or link). For sidelink unicast, the session is shared by two UEs; for sidelink groupcast, the session is shared by a group of UEs.

A session-based channel occupancy ratio (CR or COR) at slot n may be defined as the total number of sub-channels used for a session member's transmission in slots [n−a, n−1] and granted in slots [n, n+b], divided by the total number of sub-channels in the transmission pool over [n−a, n+b], at least as one possibility.

For example, in sidelink unicast with UE-A and UE-B, UE-A may calculate the summation of the number of sub-channels used for its transmission to UE-B, and the number of sub-channels used for UE-B's transmission to UE-A. The division of this summation over the total number of sub-channels in the transmission pool may be specified as the session-based COR for the sidelink unicast session between UE-A and US-B.

The session-based COR could also be calculated per priority level, i.e., $COR(p_i, session_j)$ for the data priority level $p_i$ for sidelink session j. The session-based COR could be used for congestion control purpose. For example, a per priority level threshold may be pre-configured or may be configured during session setup process, e.g., $COR_{limit}(p_i, session_j)$. If a mode 2 UE has some data transmission for sidelink unicast or groupcast, after resource selection, it may check if the current transmission to the sidelink session will exceed the limitation configured for this session, i.e., $\Sigma_{k \geq i} COR(p_k, session_j) > COR_{limit}(p_i, session_j)$. If so, then the sidelink unicast/groupcast transmission may be dropped.

In an alternative way, the session-based COR may be used in the resource selection procedure by a mode 2 UE for its sidelink unicast or groupcast transmission. For example, the upper bound on session-based COR may impact the percentage of the candidate resources to be reported to higher layer by the UE.

The session-based COR may be used independently, or may be jointly used with UE-based COR (e.g., the legacy LTE V2X COR). For example, both a condition on session-based COR, i.e., $\Sigma_{k \geq i} COR(p_k, session_j) \leq COR_{limit}(p_i, session_j)$ and a condition on UE-based COR, i.e., $\Sigma_{k \geq i} COR(p_k) \leq COR_{limit}(p_i)$, could be configured and used in parallel, if desired.

Note that for in-device coexistence of LTE and NR sidelinks, it may be the case that a short time scale TDM approach is feasible when the traffic load of LTE and NR is at or below an acceptable level. To determine whether or when to use such a short time scale TDM approach, a metric of LTE or NR traffic load may be defined. A threshold on this metric could be configured, e.g., such that if the metric is above the threshold, the short time scale TDM solution is not used.

One possible metric can be the COR for LTE sidelink, or COR for NR sidelink. Let $COR_{LTE}$ be the COR for LTE sidelink and let $COR_{NR}$ be the COR for NR sidelink. The $COR_{LTE}$ can be per UE or per UE per priority level. The $COR_{NR}$ can be per UE, per UE per priority level, or per UE per sidelink session. One or more COR thresholds for LTE sidelink (e.g., $COR_{LTE}^{limit}$) and one or more COR thresholds for NR sidelink (e.g., $COR_{NR}^{limit}$) can be configured.

As one possibility, the configuration can be per resource pool, e.g., via common configuration. As another possibility, the configuration can be UE specific, e.g., via dedicated configuration.

If the measured $COR_{LTE}$ is below the threshold $COR_{LTE}^{limit}$, and/or the measured $COR_{NR}$ is below the threshold $COR_{NR}^{limit}$, then the short time scale TDM approach may be used.

In LTE V2X Release 15, the DMRS symbols may have fixed locations in the time domain. Among 14 symbols in a subframe, the first symbol is AGC and the last symbol is a GAP symbol. Hence, there are 12 symbols for data and DMRS. The DMRS symbols are located at the 2, 5, 8, 11 symbols. This design may ensure that every data symbol is located next to a DMRS symbol.

In NR V2X, slot aggregation may be used to support large payload sizes. In slot aggregation, the overhead of AGC and GAP may be reduced, since among the consecutive slots for the same data, the GAP and AGC may not be needed.

For example, in the first slot of slot aggregation, the first symbol may be for AGC and the last symbol may be for data or DMRS. In the last slot of slot aggregation, the first symbol may be for data or DMRS and the last symbol may be for GAP. In the middle slots of slot aggregation, both the first symbol and the last symbol may be for data or DMRS.

The DMRS configuration may consider this feature and have different DMRS pattern indices for different types of slots. In one approach, instead of a single DMRS pattern being indicated (e.g., in SCI), multiple DMRS patterns may be indicated in the case of slot aggregation. For example, one for the first slot, one for the last slot, and one or more for the middle slots (e.g., if applicable, such as if more than 2 slots are aggregated).

In an alternative approach, the DMRS pattern indication could be in terms of the starting DMRS symbol and the gap between two DMRS symbols. In this way, a similar DMRS density among the slots in the slot aggregation may be specified.

If the data for V2X transmissions are for unicast or groupcast, then in the resource selection procedure, it may be the case that the target UE(s) transmissions are considered. This may help reduce the potential impact of the half-duplex issue at the target UE(s). For example, if some periodic resources are reserved by one or more target UEs, then the transmitting UE may be able to determine that the unicast or groupcast transmissions at the corresponding slots may not be received by the target UE due to the half duplex issue. Hence, it may be the case that all of the resources in the slots reserved by target UEs for their transmissions are excluded during the resource selection procedure.

In a first approach to implementing such resource selection exclusion, in the resource selection procedure, if the sidelink data is for unicast or groupcast, then the destination (group) ID may be considered. Specifically, if the destination UEs have reserved resources at certain slots, then these slots may be avoided. The principle may be that the source UE treats the destination UE(s) reserved resources as its own reserved resources.

In a second approach, if the sidelink data is for unicast or groupcast, the legacy resource selection procedure may be applied. After the candidate resources are selected, the source UE may remove certain candidate resources if the corresponding time unit is used by the destination UE for its transmissions. Then the modified candidate resources may be reported to higher layer for final resource determination.

In a third approach, if the sidelink data is for unicast or groupcast, the legacy resource selection procedure may be applied, and the candidate resources may be reported to higher layer for final resource determination. In case the final selected resource has the time conflict, i.e., the destination UE will use this time unit for its transmissions, then the resource may dropped and it may be the case that the source UE does not perform the sidelink transmission. A resource reselection procedure may be triggered subsequently.

Similarly, in the source UE's resource selection procedure, it may be the case that the source UE reception in sidelink unicast or groupcast is considered. This may help reduce the potential impact of the half-duplex issue at the source UE. For example, if some periodic resources are reserved by another UE to unicast or groupcast to the source UE, then the source UE may be able to determine that any transmissions at the corresponding slots may not be available for its sidelink data transmissions due to the half duplex issue. Hence, it may be the case that all of the resources in the slots which are reserved by another UE for sidelink unicast/groupcast transmission to the source UE are excluded during the resource selection procedure.

In a first approach to implementing such resource selection exclusion, in the resource selection procedure, the principle may be that the source UE treats another UE's reserved resources (for the unicast or groupcast to the source UE) as the source UE's own reserved resources.

Furthermore, the additional resource exclusion may depend on data QoS. For example, if the source UE's data to transmit has a lower priority than the source UE's unicast/groupcast data reception, then the additional resource exclusion may be applied. Otherwise, the additional resource exclusion may not be applied.

The additional resource exclusion in the resource selection procedure based on if any resources are reserved for transmission(s) to the source UE can be used together with the additional resource exclusion based on if any resources are reserved for transmission(s) by the destination UE(s).

Figure 10:
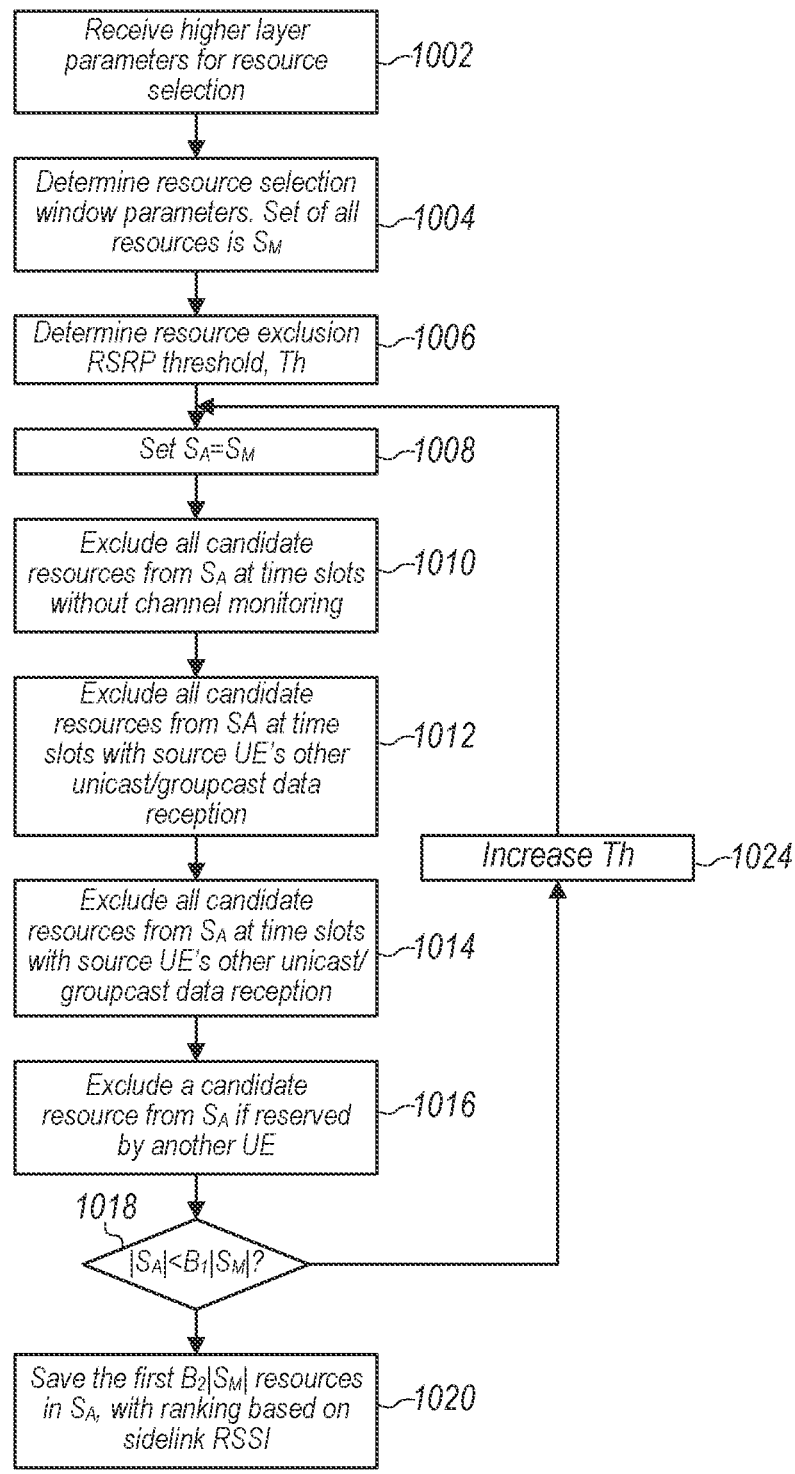
FIG. 10 is a flowchart diagram illustrating aspects of an exemplary possible technique for performing resource selection for PSSCH transmission, according to some embodiments.

FIG. 10 shows an exemplary resource selection procedure in consideration of half duplex issue at both source UE and destination UE(s). As shown, in 1002, the source UE may receive higher layer parameters for resource selection. In 1004, resource selection window parameters may be determined, where the set of all resources may be defined as $S_M$. In 1006, a resource exclusion RSRP threshold "Th" may be determined. In 1008, a set of resources $S_A$ may be set equal to $S_M$. In 1010, all candidate resources from $S_A$ without channel monitoring may be excluded. In 1012, time units during which the source UE expects to receive sidelink unicast or groupcast transmissions may be excluded. In 1014, time units during which the destination UE is planning to make transmissions may be excluded. In 1016, any candidate resources from $S_A$ that are reserved by another UE may be excluded. In 1018, it may be determined if |SA|<B₁|SA|. If yes, "Th" may be increased and the procedure may return to step 1008. If no, in 1020, the first B₂|SM| resources in S_A may be saved, with ranking based on sidelink RSSI.

Figure 11:
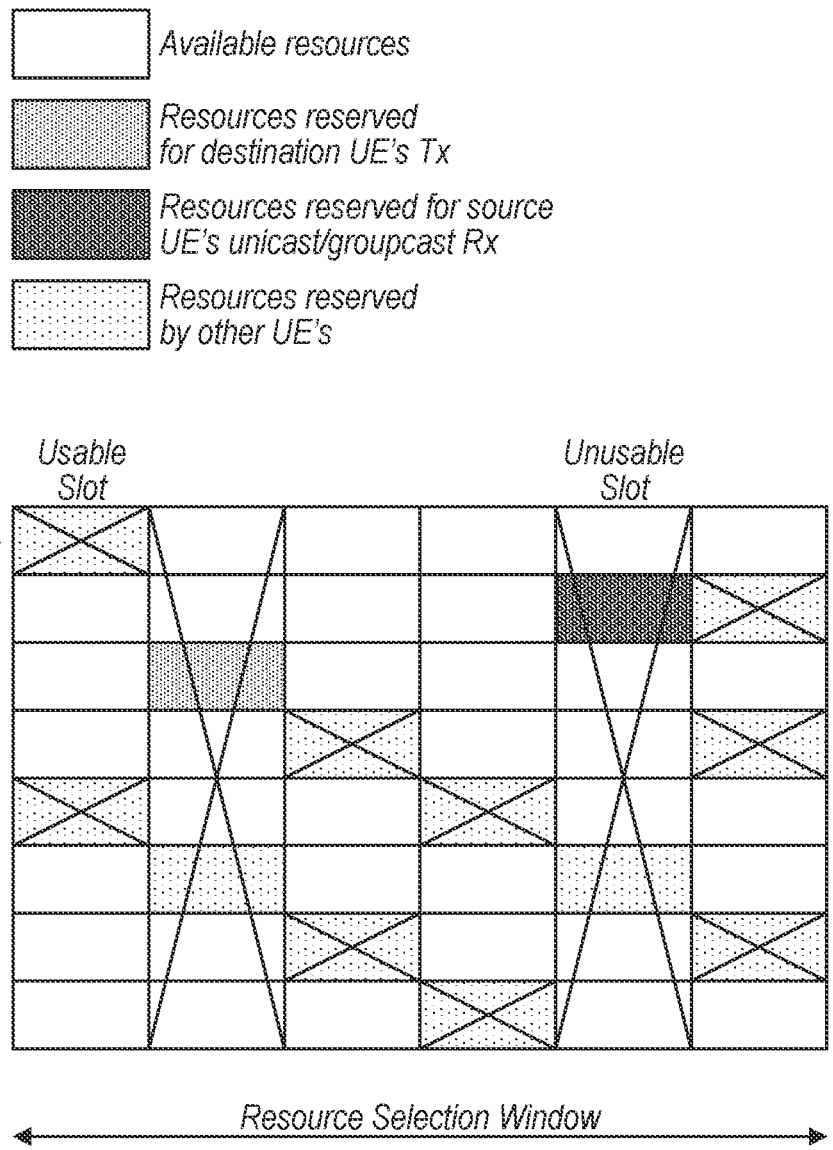
FIG. 11 illustrates exemplary aspects of a possible approach to performing resource selection for PSSCH transmission in which certain resources are excluded from consideration, according to some embodiments.

FIG. 11 shows an example of resource exclusion for sidelink unicast or groupcast. As shown, the resources reserved by UEs other than unicast or groupcast destination UEs are excluded. If a unicast or groupcast destination UE reserves a resource, then the resources in the whole slot are excluded. In other words, this slot may be marked as an unusable slot. Additionally, if a UE has some unicast or groupcast sidelink reception at a resource, then the resources in the whole slot are excluded.

Figure 12:
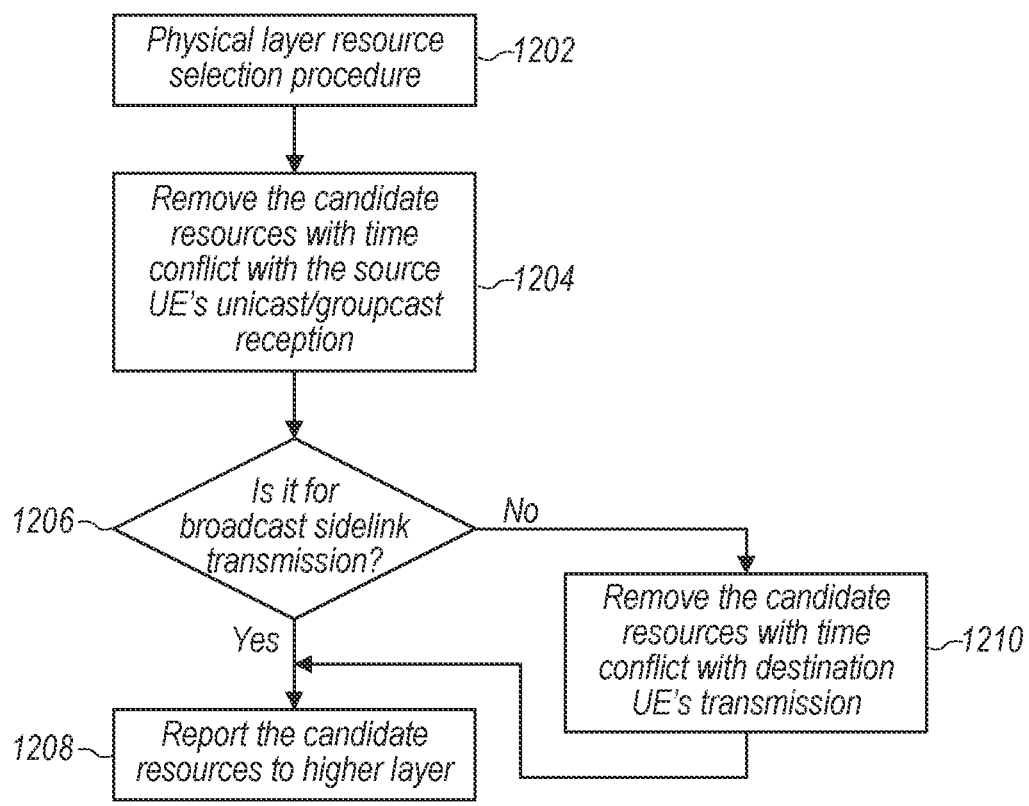
FIGS. 12-13 are flowchart diagrams illustrating aspects of further exemplary possible techniques for performing resource selection for PSSCH transmission, according to some embodiments.

FIG. 12 is a flowchart diagram illustrating another possible approach to performing resource selection with additional candidate resources removal in consideration of the half duplex issue at both source UE and destination UE(s) for sidelink unicast or groupcast. As shown, in 1202 the (e.g., legacy) physical layer resource selection procedure may be applied. In 1204, after the candidate resources are selected, the source UE may remove certain candidate resources if the corresponding time unit(s) is (are) used by the source UE for its unicast or groupcast data reception. In 1206, it may be determined if the resource selection is for a broadcast sidelink transmission. If not, in 1206, the source UE may remove certain candidate resources if the corresponding time unit(s) is (are) used by any destination UEs for their unicast or groupcast data transmission. In 1208, the (possibly modified) candidate resources may be reported to higher layer for final resource determination.

Figure 13:
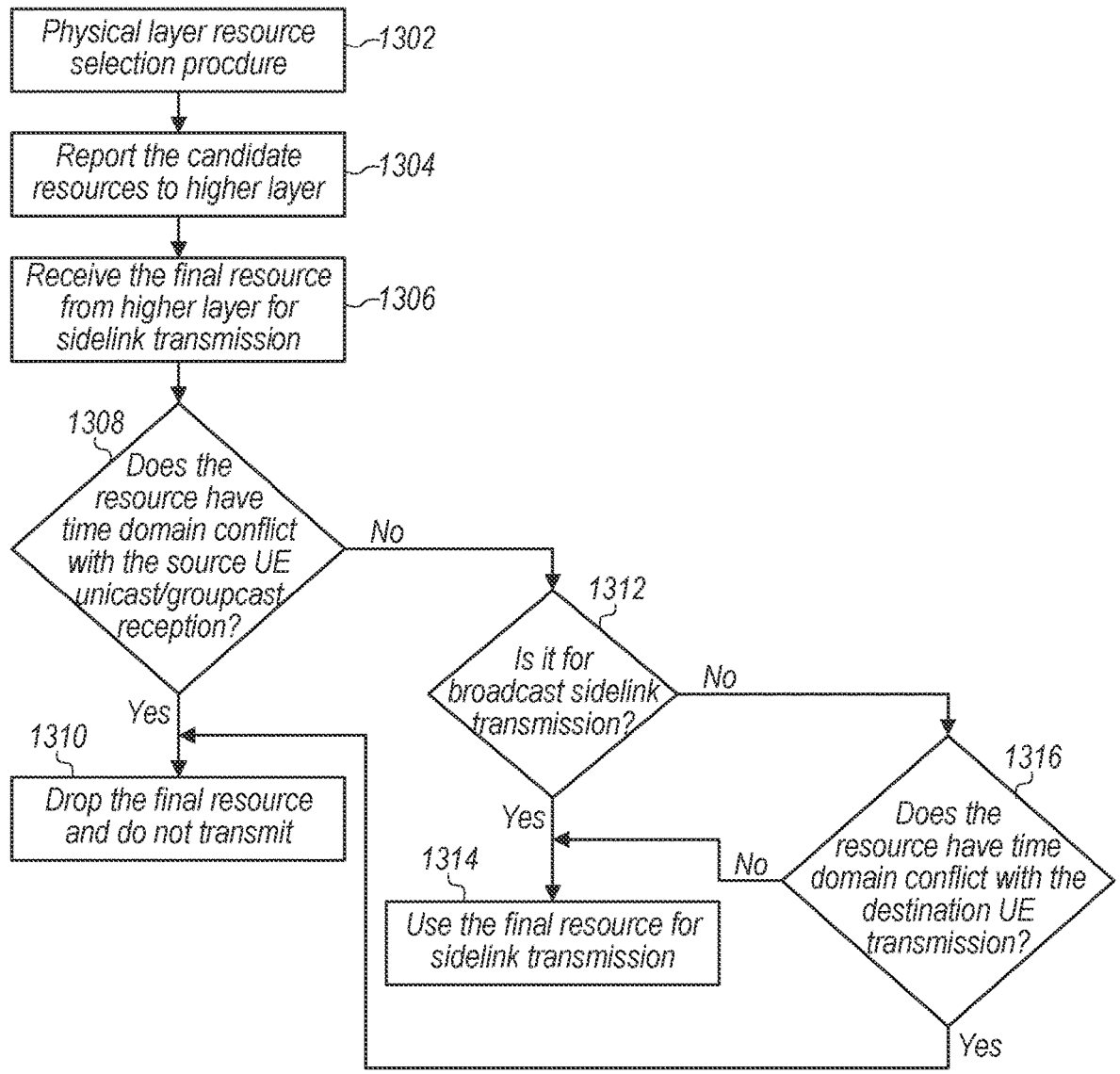

FIG. 13 shows a still further exemplary procedure of resource selection with final resource dropping in consideration of half duplex at both source UE and destination UE(s) for sidelink unicast or groupcast. As shown, in such an approach, in 1302, the legacy resource selection procedure may be applied, and in 1304 the candidate resource(s) may be reported to a higher layer for final resource determination. In 1306, an indication of the final resource(s) selected for the sidelink transmission may be received from the higher layer. In 1308, it may be determined if any of the selected resource(s) have a time domain conflict with the source UE for its unicast or groupcast reception. In 1310, in the case that the final selected resource(s) have a time conflict with the source UE for its unicast or groupcast reception, then the resource(s) may be dropped and it may be the case that the source UE does not perform the sidelink transmission. In 1312, if there is no time conflict with the source UE for its unicast or groupcast reception, it may be determined if the resource(s) is (are) for broadcast sidelink transmission. If so, in 1314, the final resource(s) may be used for the broadcast sidelink transmission. If the resource(s) is (are) not for broadcast sidelink transmission, in 1316, the source UE may further determine if the selected resource(s) have a time conflict with any destination UEs for their unicast or groupcast data transmission. If not, the procedure may proceed to step 1314 and the final resource(s) may be used for the transmission. If so, the procedure may proceed to step 1310, the resource(s) may be dropped and it may be the case that the source UE does not perform the sidelink transmission. In case the source UE does not perform the sidelink transmission, a resource reselection procedure may be triggered subsequently.

It may be the case that PSFCH resources can have a periodicity of 1, 2 or 4 slots. For a PSFCH resource periodicity of more than 1 slot, the additional resource exclusion, in consideration of source UE sidelink unicast/ groupcast reception, can be extended so as to avoid the case where a UE has to transmit data and receive HARQ feedback at the same time. For example, with the implicit association between PSSCH and PSFCH, the time slot with the PSFCH may be associated with multiple time slots of PSSCH if the PSFCH resource periodicity is more than 1 slot. In the resource selection procedure for sidelink unicast/ groupcast transmission with HARQ feedback enabled, if a source UE has some unicast/groupcast sidelink reception with HARQ feedback enabled at a certain time slot, then not only the resources in that time slot may be excluded, but also the resources in neighbor time slots which share the same PSFCH slot with that time slot may be excluded, at least according to some embodiments.

For a given resource pool, PSFCH resources could be at the last few symbols of a slot, while the PSFCH periodicity, m, could be every single slot, every 2 slots, or every 4 slots, depending on resource pool configuration, at least in some instances. It may be the case that for a PSSCH transmission with its last symbol in slot n, when the corresponding HARQ feedback is due for transmission, it is expected to be in slot n+a, where a is the smallest integer larger than or equal to K with the condition that slot n+a contains PSFCH resources.

For different values of PSFCH periodicity m, the maximum number of slots of PSSCH to PSFCH delay can be different. For example, if m=1, then the PSSCH to PSFCH gap is K slots; if m=2, then the PSSCH to PSFCH gap can be K or K+1 slots; if m=4, then the PSSCH to PSFCH gap can be K, K+1, K+2, or K+3 slots. Hence, the overall PSFCH latency may depend on PSFCH periodicity. The PSSCH to PSFCH gap K could depend on PSFCH periodicity m. For example, in general, for larger values of m, K may be smaller. Let $K_m$ be the gap corresponding to PSFCH periodicity m, m=1,2,4. In this scenario, it may be the case that $K_4 \leq K_2 \leq K_1$. For example, it could be the case that $K_1=4$, $K_2=3$ and $K_4=1$. In some instances, the possible values K could be configured such that the largest PSSCH to PSFCH gap may be no larger than a specified number of slots (e.g., 4 slots, in the preceding example), e.g., no matter the PSFCH periodicity. The selection of K can also depend on the sub-carrier spacing of the resource pool or sidelink bandwidth part, in some instances. For example, in general, it may be the case that for larger sub-carrier spacing, the value K may also be larger, e.g., to achieve data latency requirements, at least according to some embodiments.

For PSFCH periodicity m, e.g., m=1, 2, 4 slots, m PSFCH corresponding to m PSSCH transmissions may share the whole i-th sub-channel at slot $n+k_m$. It may be the case that the m PSFCH equally share the resources on the same sub-channel in the frequency domain. For example, the j-th, j=1, . . . , m, PSFCH may occupy the j-th $$\left\lfloor \frac{N_{RB}^{subchannel}}{m} \right\rfloor$$

RBs of this subchannel, where $N_{RB}^{subchannel}$ is the configured sub-channel size of the resource pool. The j-th PSFCH may correspond to the PSSCH transmission on the i-th sub-channel at slot n−(m−j). Note that it may be possible that $mod(N_{RB}^{subchannel}, m) \neq 0$. One of the following schemes may be used for the additional resources in such a scenario, among various possibilities:

The last mod $(N_{RN}^{subchannel}, m)$ RBs of a sub channel may be left unused.

The last mod ($N_{RB}^{subchannel}$, m) RBs of a sub-channel may be used by the last (i.e., the m-th) PSFCH.

The last mod ($N_{RN}^{subchannel}$, m) RBs of a sub-channel may be used by a PSFCH corresponding to sidelink groupcast to support HARQ feedback from multiple receiving UEs. The usage of the last mod($N_{RN}^{subchannel}$, m) RBs of a sub channel may be reserved for such use in the SCI of a PSSCH transmission.

Based on such a frequency domain association scheme, the allocated PSFCH frequency resource for a PSSCH transmission may have $$\left\lfloor \frac{N_{RB}^{subchannel}}{m} \right\rfloor$$

RBs. If a PSFCH format such as NR PUCCH format 0 is used, then it may be the case that it occupies 1 PRB. If $$\left\lfloor \frac{N_{RB}^{subchannel}}{m} \right\rfloor > 1,$$

then the allocated PSFCH resource may be more than the required resource for the given PSFCH format. In such a scenario, either of the following two alternatives could be used, among various possibilities.

As a first possibility, the PSFCH format 0 sequence is only placed in one PRB (e.g., the first PRB) of the allocated PSFCH resource, while leaving the remaining PRBs of the allocated PSFCH resource empty.

As a second possibility, the PSFCH format 0 sequence is duplicated over part or all the PRBs of the allocated PSFCH resource. The same or different PSFCH sequences may be used for different PRBs of the allocated PSFCH resource. In such a scenario, the transmitting UE, which expects to receive the HARQ feedback, may combine the PSFCH sequences from different PRBs of the allocated PSFCH resource to achieve better PSFCH decoding performance.

The selection between these first and second possibilities may be performed using the resource pool configuration, or pre-configuration, or may be indicated in the SCI of the PSSCH transmission, among various possibilities.

In some instances, each PSSCH may use 1 subchannel. It is also possible that a PSSCH uses more than 1 subchannel. Thus, if the preceding PSSCH to PSFCH frequency domain association (per subchannel) is used, there may be more than 1 PSFCH resource allocated for this PSSCH. In such a scenario, either of the following two alternatives could be used, among various possibilities.

As a first possibility, a receiving UE only uses one of these PSFCH resource to send HARQ feedback (e.g., the first PSFCH in the frequency domain).

As a second possibility, a receiving UE uses more than one of these PSFCH resources to send HARQ feedback. The PSFCH format 0 sequence is duplicated over multiple PSFCH resources. The same or different PSFCH sequences may be used for different PSFCH resources. Then the transmitting UE, which expects to receive the HARQ feedback, may combine the PSFCH sequences from different PSFCH resources to achieve better PSFCH decoding performance.

The selection between these first and second possibilities may be performed using the resource pool configuration, or pre-configuration, or may be indicated in the SCI of the PSSCH transmission, among various possibilities.

Consider a scenario in which the sequence-based HARQ feedback, as in NR PUCCH format 0, is used for the PSFCH (i.e., short PSFCH format). Then a total of 12 sequences with different cyclic shifts may be used in a PSFCH resource, which may span 1 PRB in frequency. Each receiver UE may use 4 sequences for its 2-bit HARQ ACK/NACK information. This may imply that a PSFCH resource can be multiplexed by 3 receiver UEs. For sidelink group communication with a large group size (e.g., larger than 3), it may be the case that more than one PSFCH resource will be used. These PSFCH resources can be frequency division multiplexed within a subchannel. It may be the case that a small configured subchannel size may restrict the total number of PSFCH resources within a subchannel, and subsequently restrict the total number of receiver UEs which can feedback HARQ ACK/NACK in sidelink groupcast.

For example, if the subchannel size is 2 RBs, then it may be the case that the sidelink groupcast HARQ ACK/NACK feedback scheme can be applied only if the group size is less than or equal to 6 (or 7 to include the transmit UE in the group). If the sub-channel size is 3 RBs, then it may be the case that the sidelink groupcast HARQ ACK/NACK feedback scheme can be applied only if the group size is less than or equal to 9 (or 10 including the transmit UE in the group).

An alternative approach to enhance the HARQ ACK/NACK feedback capability in sidelink groupcast could include to increase the number of symbols for PSFCH resources. For example, two symbols could be used at the end of a slot to support more HARQ ACK/NACK feedback in sidelink groupcast. Different receiver UEs in a sidelink group may use different symbols together with different frequency locations of a subchannel to send their HARQ feedback. Which time and/or frequency location a receiver UE could use for this HARQ feedback may depend on the UE's in-group member ID, or its RNTI. The number of symbols used for groupcast may be configured during the groupcast session establishment procedure or may be dynamically indicated in SCI for each sidelink groupcast.

As previously described herein, in 'Option 3' of PSCCH and PSSCH multiplexing, the PSCCH and PSSCH share the same block of resources. It is possible that the PSCCH occupies a few symbols at the beginning of a slot, and occupies a few resource blocks at the beginning of a subchannel.

The SCI stage 2 could be carried in the PSSCH portion of the block of resources. In general, the SCI stage 2 could be at the beginning of a slot to achieve early decoding. Additionally, it may be the case that the SCI stage 2 is limited from the frequency boundary of a slot by at least a certain amount. This may help reduce or avoid the in-band emissions from another subchannel, and hence increase the reliability of the SCI stage 2 transmissions. The frequency domain offset from the subchannel boundary can be (pre) configured or pre-defined. A transmitter UE may fill in the SCI stage 2 in the resources beyond that frequency limited region.

Figure 14:
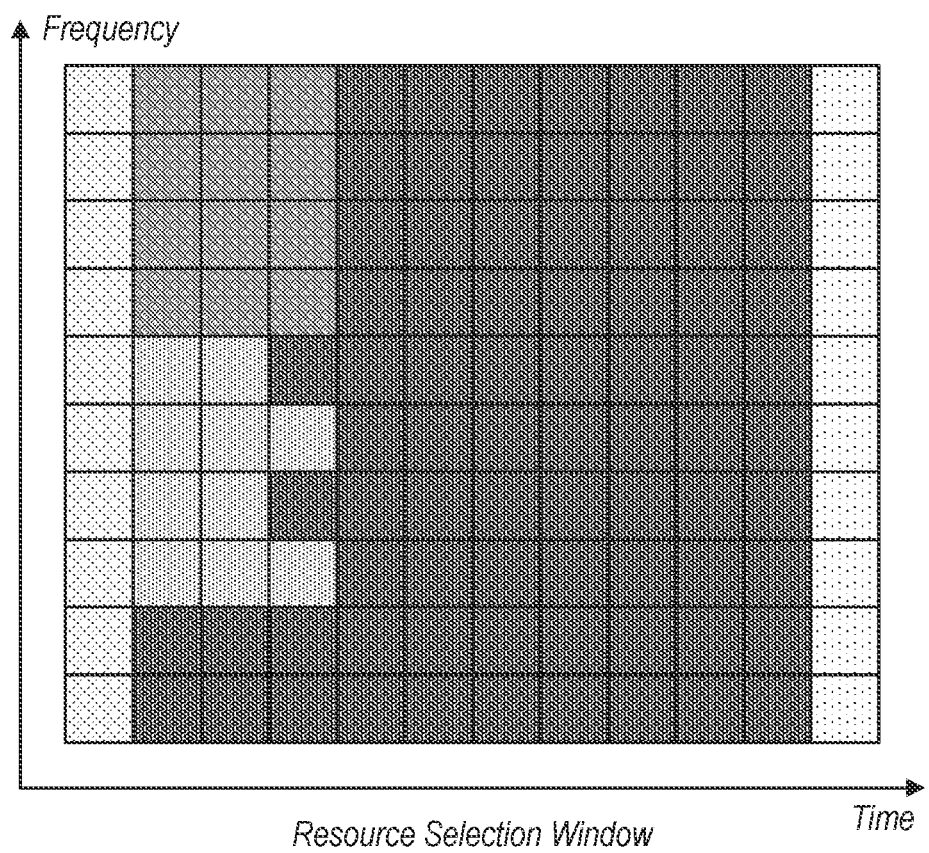
FIG. 14 illustrates exemplary aspects of a possible approach to performing resource mapping for stage 2 sidelink control information in which a frequency domain offset from the subchannel boundary is configured, according to some embodiments.

If the SCI stage 1 starts from one edge of a sub-channel, then it may be the case that the frequency limited region may be on the side of the opposite edge of the sub-channel; if the SCI stage 1 does not start from either edge of a sub-channel, the frequency limited region may be on both edges of the sub-channel. The size of the frequency limited region can depend on the size of the sub-channel, at least according to some embodiments. FIG. 14 shows an exemplary possible SCI stage 2 resource mapping. In the illustrated scenario, the resources at the last two REs of the sub-channel in the frequency domain are excluded from use for the SCI stage 2, e.g., to avoid in-band emission.

In the following further exemplary embodiments are provided.

One set of embodiments may include an apparatus, comprising: a processor configured to cause a first wireless device to: receive vehicle-to-everything (V2X) resource pool configuration information; receive V2X sidelink control information; determine a number of resource elements allocated for a V2X physical sidelink shared channel (PSSCH) based at least in part on the V2X resource pool configuration information and the V2X sidelink control information; and determine a transport block size (TBS) for the V2X PSSCH based at least in part on the number of resource elements allocated for the V2X PSSCH.

According to some embodiments, the processor is further configured to cause the first wireless device to: determine a number of resource elements in a set of sub-channels that carry the PSSCH based at least in part on a number of sub-channels in the set of sub-channels and a number of resource elements in each sub-channel; determine a number of non-PSSCH resource elements in the set of sub-channels that carry the PSSCH; and subtract the number of non-PSSCH resource elements in the set of sub-channels that carry the PSSCH from the number of resource elements in a set of sub-channels that carry the PSSCH to determine the number of resource elements allocated for the V2X PSSCH.

According to some embodiments, the non-PSSCH resource elements comprise one or more of: resource elements allocated to first stage sidelink control information; resource elements allocated to demodulation reference signals; resource elements allocated to channel state information reference signals; phase tracking reference signals; resource elements allocated to a physical sidelink feedback channel; resource elements allocated to AGC and/or GAP; or resource elements allocated to second stage sidelink control information.

According to some embodiments, the processor is further configured to cause the first wireless device to: determine whether the V2X PSSCH is being used for an initial transmission or a retransmission based at least in part on the V2X sidelink control information; and determine a low density parity check (LDPC) base graph for the V2X PSSCH based at least in part on whether the V2X PSSCH is being used for an initial transmission or a retransmission.

According to some embodiments, the processor is further configured to cause the first wireless device to: select a same LDPC base graph for the V2X PSSCH as used in a corresponding initial transmission if the V2X PSSCH is being used for a retransmission; and select a LDPC base graph for the V2X PSSCH based at least in part on the TBS for the V2X PSSCH if the V2X PSSCH is being used for an initial transmission.

According to some embodiments, the processor is further configured to cause the first wireless device to: determine a model TBS for the V2X PSSCH, wherein the model TBS is calculated in a manner configured to nullify TBS calculation differences between PSSCH initial transmissions and PSSCH retransmissions; and select a low density parity check (LDPC) base graph for the V2X PSSCH based at least in part on the model TBS for the V2X PSSCH.

According to some embodiments, the processor is further configured to cause the first wireless device to: determine resource elements allocated to second stage sidelink control information in a sub-channel that carries the V2X PSSCH, wherein the resource elements allocated to the second stage sidelink control information are limited from a subchannel boundary of the sub-channel by a frequency domain offset.

Another set of embodiments may include a first wireless device, comprising: at least one antenna for performing wireless communications; a radio coupled to the at least one antenna; and a processor coupled to the radio; wherein the first wireless device is configured to: calculate a number of resource elements allocated for a vehicle-to-everything (V2X) physical sidelink shared channel (PSSCH); determine a transport block size (TBS) for the V2X PSSCH based at least in part on the number of resource elements allocated for the V2X PSSCH; and determine a low density parity check (LDPC) base graph for the PSSCH based at least in part on the determined TBS.

According to some embodiments, the first wireless device is further configured to: determine a channel occupancy ratio for a V2X sidelink communication session; determine whether to perform a V2X sidelink transmission for the V2X sidelink communication session based at least in part on whether the V2X sidelink transmission would cause the channel occupancy ratio for the V2X sidelink communication session to exceed a channel occupancy ratio limit for the V2X sidelink communication session.

According to some embodiments, the channel occupancy ratio for the V2X sidelink communication session is further determined on a per priority level basis.

According to some embodiments, the first wireless device is further configured to: receive configuration information indicating that slot aggregation is configured for the V2X PSSCH, wherein the configuration information further indicates a demodulation reference signal (DMRS) configuration for each of a first slot of the V2X PSSCH, one or more middle slots of the V2X PSSCH, and a last slot of the V2X PSSCH.

According to some embodiments, the first wireless device is further configured to: receive configuration information indicating that slot aggregation is configured for the V2X PSSCH, wherein the configuration information further indicates a starting demodulation reference signal (DMRS) symbol and a gap between DMRS symbols for the V2X PSSCH.

Yet another set of embodiments may include a method, comprising: by a first wireless device: determining a number of resource elements allocated for a vehicle-to-everything (V2X) physical sidelink shared channel (PSSCH); determining a transport block size (TBS) for the V2X PSSCH based at least in part on the number of resource elements allocated for the V2X PSSCH; and determining a low density parity check (LDPC) base graph for the PSSCH based at least in part on the determined TBS.

According to some embodiments, the method further comprises: determining if one or more resources are reserved for V2X sidelink transmission by a second wireless device, wherein the second wireless device is a destination wireless device for a V2X sidelink transmission by the first wireless device; determining if one or more resources are reserved for V2X sidelink transmission to the first wireless device and performing resource selection for the V2X sidelink transmission by the first wireless device, wherein if one or more resources are reserved for V2X sidelink transmission by the second wireless device, any resources in a same time slot as the one or more resources reserved for V2X sidelink transmission by the second wireless device are excluded from the resource selection for the V2X sidelink transmission by the first wireless device, wherein if one or more resources are reserved for V2X sidelink transmission to the first wireless device, any resources in a same time slot as the one or more resources reserved for V2X sidelink transmission to the first wireless device are excluded from the resource selection for the V2X sidelink transmission by the first wireless device.

According to some embodiments, the method further comprises: determining relative priority levels of the V2X sidelink transmission by the second wireless device, the V2X sidelink transmission to the first wireless device, and the V2X sidelink transmission by the first wireless device; and determining whether to exclude any resources in a same time slot as the one or more resources reserved for V2X sidelink transmission by the second wireless device or any resources in a same time slot as the one or more resources reserved for V2X sidelink transmission to the first wireless device from resource selection for the V2X sidelink transmission by the first wireless device based at least in part on the relative priority levels of the V2X sidelink transmission by the second wireless device, the V2X sidelink transmission to the first wireless device, and the V2X sidelink transmission by the first wireless device.

According to some embodiments, the method further comprises: performing resource selection for a V2X sidelink transmission by the first wireless device; determining if one or more resources are reserved for V2X sidelink transmission by a second wireless device, wherein the second wireless device is a destination wireless device for the V2X sidelink transmission by the first wireless device; determining if one or more resources are reserved for V2X sidelink transmission to the first wireless device; and removing any resources in a same time slot as the one or more resources reserved for V2X sidelink transmission by the second wireless device and any resources in a same time slot as the one or more resources reserved for V2X sidelink transmission to the first wireless device from the resources selected for the V2X sidelink transmission by the first wireless device.

According to some embodiments, the method further comprises: performing resource selection for a V2X sidelink transmission by the first wireless device; determining if one or more resources are reserved for V2X sidelink transmission by a second wireless device, wherein the second wireless device is a destination wireless device for the V2X sidelink transmission by the first wireless device; determining if one or more resources are reserved for V2X sidelink transmission to the first wireless device; and dropping the V2X sidelink transmission by the first wireless device if any resources selected for the V2X sidelink transmission by the first wireless device are in a same time slot as the one or more resources reserved for V2X sidelink transmission by the second wireless device or if any resources selected for the V2X sidelink transmission by the first wireless device are in a same time slot as the one or more resources reserved for V2X sidelink transmission to the first wireless device.

According to some embodiments, the method further comprises: determining a slot in which feedback for the V2X PSSCH is expected, wherein the slot in which feedback for the V2X PSSCH is expected is determined as a first slot in which a V2X physical sidelink feedback channel (PSFCH) is present after a PSFCH gap, wherein a value of the PSFCH gap is determined based at least in part on a periodicity of the V2X PSFCH.

According to some embodiments, the method further comprises: determining one or more V2X physical sidelink feedback channel (PSFCH) frequency resources in which feedback for the V2X PSSCH is expected, wherein the V2X PSFCH frequency resources in which feedback for the V2X PSSCH is expected are determined based at least in part on a periodicity of the V2X PSFCH.

According to some embodiments, the method further comprises: determining one or more V2X physical sidelink feedback channel (PSFCH) frequency resources in which feedback for the V2X PSSCH is expected, wherein the V2X PSFCH frequency resources in which feedback for the V2X PSSCH is expected are determined based at least in part on a group size of a groupcast group associated with the V2X PSSCH.

A further exemplary embodiment may include a method, comprising: performing, by a wireless device, any or all parts of the preceding examples.

Another exemplary embodiment may include a device, comprising: an antenna; a radio coupled to the antenna; and a processor operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
a wireless device,
   determining a number of resource elements (REs) allocated for a New Radio (NR) physical sidelink shared channel (PSSCH); and
   determining a transport block size (TBS) for the NR PSSCH based at least in part on the number of REs for PSSCH allocated for the NR PSSCH, wherein the number of REs allocated for the NR PSSCH is based on a total number of REs in channel resources for the NR PSSCH minus non-PSSCH REs;
   determining a number of REs in a set of sub-channels that carry the NR PSSCH based at least in part on a number of sub-channels in the set of sub-channels and a number of REs in each sub-channel;
   determining a number of non-PSSCH REs in the set of sub-channels that carry the NR PSSCH; and
   subtracting the number of non-PSSCH REs in the set of sub-channels that carry the NR PSSCH from the number of REs in a set of sub-channels that carry the NR PSSCH to determine the number of resource elements allocated for the NR PSSCH.

2. The method of claim 1,
wherein the non-PSSCH REs comprise REs allocated to a first stage sidelink control information, resource elements allocated to demodulation reference signals, and resource elements allocated to a second stage sidelink control information.

3. The method of claim 1, further comprising:
the wireless device,
   determining whether the NR PSSCH is being used for an initial transmission or a retransmission based at least in part on NR sidelink control information.

4. The method of claim 3, further comprising:
the wireless device,
   determining a low density parity check (LDPC) base graph for the NR PSSCH based at least in part on whether the NR PSSCH is being used for an initial transmission or a retransmission.

5. The method of claim 4, further comprising:
the wireless device,
   selecting a same LDPC base graph for the NR PSSCH as used in a corresponding initial transmission when the NR PSSCH is being used for a retransmission; and
   selecting a LDPC base graph for the NR PSSCH based at least in part on the TBS for the NR PSSCH when the NR PSSCH is being used for an initial transmission.

6. The method of claim 1, further comprising:
the wireless device,
   determining a model TBS for the NR PSSCH, wherein the model TBS is calculated in a manner configured to nullify TBS calculation differences between NR PSSCH initial transmissions and NR PSSCH retransmissions; and
   selecting a low density parity check (LDPC) base graph for the NR PSSCH based at least in part on the model TBS for the NR PSSCH.

7. The method of claim 1, further comprising:
the wireless device,
   determining REs allocated to second stage sidelink control information in a sub-channel that carries the NR PSSCH, wherein the REs allocated to the second stage sidelink control information are limited from a subchannel boundary of the sub-channel by a frequency domain offset.

8. The method of claim 1, further comprising:
the wireless device,
   determining a channel occupancy ratio for an NR sidelink communication session; and
   determining whether to perform an NR sidelink transmission for the NR sidelink communication session based at least in part on whether the NR sidelink transmission would cause the channel occupancy ratio for the NR sidelink communication session to exceed a channel occupancy ratio limit for the NR sidelink communication session.

9. A wireless device, comprising:
at least one antenna for performing wireless communications;
a radio coupled to the at least one antenna; and
a processor coupled to the radio; and
wherein the wireless device is configured to:
   determine a number of resource elements (REs) allocated for a New Radio (NR) physical sidelink shared channel (PSSCH); and
   determine a transport block size (TBS) for the NR PSSCH based at least in part on the number of REs for PSSCH allocated for the NR PSSCH;
   determine a number of REs in a set of sub-channels that carry the NR PSSCH based at least in part on a number of sub-channels in the set of sub-channels and a number of REs in each sub-channel;
   determine a number of non-PSSCH REs in the set of sub-channels that carry the NR PSSCH; and
   subtract the number of non-PSSCH REs in the set of sub-channels that carry the NR PSSCH from the number of REs in a set of sub-channels that carry the NR PSSCH to determine the number of resource elements allocated for the NR PSSCH.

10. The wireless device of claim 9,
wherein the number of REs allocated for the NR PSSCH is based on a total number of REs in channel resources for the NR PSSCH minus non-PSSCH REs.

11. The wireless device of claim 10,
wherein the non-PSSCH REs comprise REs allocated to a first stage sidelink control information, resource elements allocated to demodulation reference signals, and resource elements allocated to a second stage sidelink control information.

12. The wireless device of claim 9,
wherein the wireless device is further configured to:
   determine a channel occupancy ratio for an NR sidelink communication session; and
   determine whether to perform an NR sidelink transmission for the NR sidelink communication session based at least in part on whether the NR sidelink transmission would cause the channel occupancy ratio for the NR sidelink communication session to exceed a channel occupancy ratio limit for the NR sidelink communication session.

13. The wireless device of claim 12,
wherein the channel occupancy ratio for the NR sidelink communication session is further determined on a per priority level basis.

14. The wireless device of claim 9,
wherein the wireless device is further configured to:
   receive configuration information indicating that slot aggregation is configured for the NR PSSCH, wherein the configuration information further indicates a demodulation reference signal (DMRS) configuration for each of a first slot of the NR PSSCH, one or more middle slots of the NR PSSCH, and a last slot of the NR PSSCH.

15. The wireless device of claim 9,
wherein the wireless device is further configured to:
   receive configuration information indicating that slot aggregation is configured for the NR PSSCH, wherein the configuration information further indicates a starting demodulation reference signal (DMRS) symbol and a gap between DMRS symbols for the NR PSSCH.

16. An apparatus, comprising:
a memory; and
a processor in communication with the memory and configured to:
   determine a number of resource elements (REs) allocated for a New Radio (NR) physical sidelink shared channel (PSSCH); and
   determine a transport block size (TBS) for the NR PSSCH based at least in part on the number of REs for PSSCH allocated for the NR PSSCH, wherein the number of REs for PSSCH is based, at least in part, on a number of non-PSSCH REs, wherein the non-PSSCH REs comprise REs allocated to a first stage sidelink control information, REs allocated to demodulation reference signals, and REs allocated to a second stage sidelink control information;
   determine a number of REs in a set of sub-channels that carry the NR PSSCH based at least in part on a number of sub-channels in the set of sub-channels and a number of REs in each sub-channel;
   determine a number of non-PSSCH REs in the set of sub-channels that carry the NR PSSCH; and
   subtract the number of non-PSSCH REs in the set of sub-channels that carry the NR PSSCH from the number of REs in a set of sub-channels that carry the NR PSSCH to determine the number of resource elements allocated for the NR PSSCH.

17. The apparatus of claim 16,
wherein the number of REs allocated for the NR PSSCH is based on a total number of REs in channel resources for the NR PSSCH minus the non-PSSCH REs.

18. The apparatus of claim 16,
wherein the processor is further configured to:
   determine a model TBS for the NR PSSCH, wherein the model TBS is calculated in a manner configured to nullify TBS calculation differences between NR PSSCH initial transmissions and NR PSSCH retransmissions; and
   select a low density parity check (LDPC) base graph for the NR PSSCH based at least in part on the model TBS for the NR PSSCH.

19. The apparatus of claim 16,
wherein the processor is further configured to:
   determine REs allocated to second stage sidelink control information in a sub-channel that carries the NR PSSCH, wherein the REs allocated to the second stage sidelink control information are limited from a subchannel boundary of the sub-channel by a frequency domain offset.

20. The method of claim 8,
wherein the channel occupancy ratio for the NR sidelink communication session is further determined on a per priority level basis.

\* \* \* \* \*